United States Patent
Hui et al.

(10) Patent No.: US 9,559,750 B2
(45) Date of Patent: *Jan. 31, 2017

(54) INTERLEAVING LOW TRANSMISSION POWER AND MEDIUM TRANSMISSION POWER CHANNELS IN COMPUTER NETWORKS

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,211

(22) Filed: Jul. 2, 2015

(65) Prior Publication Data

US 2015/0311948 A1    Oct. 29, 2015

Related U.S. Application Data

(63) Continuation of application No. 13/960,663, filed on Aug. 6, 2013, now Pat. No. 9,088,983.

(51) Int. Cl.
  *H04B 1/713*     (2011.01)
  *H04B 1/7143*    (2011.01)
  (Continued)

(52) U.S. Cl.
  CPC ............ *H04B 1/7143* (2013.01); *H04B 1/713* (2013.01); *H04L 7/027* (2013.01);
  (Continued)

(58) Field of Classification Search
  USPC .......................... 375/133; 455/447; 330/338
  See application file for complete search history.

(56) References Cited

U.S. PATENT DOCUMENTS 6,125,420 A    9/2000  Eidson
6,430,150 B1   8/2002  Azuma et al.
(Continued)

FOREIGN PATENT DOCUMENTS

JP    2006508591 A    3/2006
JP    2007088856 A    4/2007
(Continued)

OTHER PUBLICATIONS

Gottar, "International Search Report and Written Opinion issued in International Application No. PCT/US2014/040043", Oct. 22, 2014, 1-61.

(Continued)

*Primary Examiner* — Eva Puente
(74) *Attorney, Agent, or Firm* — Johnson, Marcou & Isaacs, LLC

(57) ABSTRACT

In a multiple interface, low power and lossy network comprising a plurality of nodes, a low transmission power and medium transmission power topology are defined for the network and a channel-hopping schedule is defined for the devices operating in each topology. A sender determines that data is capable of being transmitted via a link on the low transmission power topology. The sender determines the transmission parameters for the transmission of the data over the link on the low transmission power topology and determines a low transmission power channel for transmission of the data. The sender transmits the determined channel and the transmission parameters to the receiver. The sender transmits the data via the determined channel in the low transmission power topology.

23 Claims, 11 Drawing Sheets

(51) Int. Cl.
*H04W 72/04* (2009.01)
*H04W 84/18* (2009.01)
*H04L 7/027* (2006.01)

(52) U.S. Cl.
CPC ... *H04W 72/0446* (2013.01); *H04W 72/0453* (2013.01); *H04W 84/18* (2013.01)

(56) References Cited

U.S. PATENT DOCUMENTS

| | | | |
|---|---|---|---|
| 7,693,064 B2 | 4/2010 | Thubert et al. | |
| 8,068,841 B2 * | 11/2011 | Laroia | H04L 5/0007 455/422.1 |
| 8,254,595 B2 * | 8/2012 | Fagg | H03D 1/00 381/106 |
| 8,891,588 B1 | 11/2014 | Hui et al. | |
| 9,088,983 B2 * | 7/2015 | Hui | H04W 72/0446 |
| 9,172,613 B2 | 10/2015 | Hui et al. | |
| 2003/0235175 A1 | 12/2003 | Naghian et al. | |
| 2004/0233928 A1 | 11/2004 | Pozsgay | |
| 2006/0285529 A1 | 12/2006 | Hares et al. | |
| 2008/0013500 A1 * | 1/2008 | Laroia | H04B 7/2621 370/338 |
| 2008/0068217 A1 | 3/2008 | Van Wyk et al. | |
| 2008/0107076 A1 | 5/2008 | Ramachandran et al. | |
| 2008/0304472 A1 | 12/2008 | Gourlay et al. | |
| 2009/0137206 A1 | 5/2009 | Sherman et al. | |
| 2009/0180451 A1 | 7/2009 | Alpert et al. | |
| 2010/0008338 A1 | 1/2010 | Tsfati et al. | |
| 2010/0014444 A1 | 1/2010 | Ghanadan | |
| 2011/0310770 A1 | 12/2011 | Liang et al. | |
| 2012/0155511 A1 | 6/2012 | Shaffer | |
| 2012/0158933 A1 | 6/2012 | Shetty et al. | |
| 2012/0166848 A1 | 6/2012 | Broad et al. | |
| 2012/0254338 A1 | 10/2012 | Agarwal et al. | |
| 2012/0300812 A1 | 11/2012 | Ly-Gagnon et al. | |
| 2012/0320923 A1 | 12/2012 | Vasseur et al. | |
| 2013/0016612 A1 | 1/2013 | Vasseur | |
| 2013/0016759 A1 | 1/2013 | Hui | |
| 2013/0022084 A1 | 1/2013 | Vasseur et al. | |
| 2013/0028140 A1 | 1/2013 | Hui | |
| 2013/0028295 A1 | 1/2013 | Hui et al. | |
| 2013/0051250 A1 | 2/2013 | Shaffer et al. | |
| 2013/0094537 A1 | 4/2013 | Hui | |
| 2013/0121335 A1 | 5/2013 | Hui et al. | |
| 2013/0188513 A1 | 7/2013 | Vasseur et al. | |
| 2013/0191688 A1 | 7/2013 | Agarwal et al. | |
| 2013/0219046 A1 | 8/2013 | Wetterwald et al. | |
| 2013/0227055 A1 | 8/2013 | Vasseur et al. | |
| 2013/0250810 A1 | 9/2013 | Ho et al. | |
| 2013/0301471 A1 | 11/2013 | Brown et al. | |
| 2014/0009109 A1 | 1/2014 | Lee et al. | |
| 2014/0029610 A1 | 1/2014 | Vasseur et al. | |
| 2014/0269413 A1 | 9/2014 | Hui et al. | |
| 2014/0328215 A1 | 11/2014 | Larsson et al. | |
| 2015/0023174 A1 | 1/2015 | Dasgupta et al. | |
| 2015/0043384 A1 | 2/2015 | Hui et al. | |
| 2015/0043519 A1 | 2/2015 | Hui et al. | |
| 2016/0021017 A1 | 1/2016 | Thubert et al. | |
| 2016/0026542 A1 | 1/2016 | Vasseur et al. | |

FOREIGN PATENT DOCUMENTS

| | | |
|---|---|---|
| JP | 2012105258 A | 5/2012 |
| JP | 2013026710 A | 2/2013 |
| JP | 2013118621 A | 6/2013 |
| JP | 2014530545 A | 11/2014 |
| WO | 2013033457 A1 | 3/2013 |

OTHER PUBLICATIONS

Gottar, "International Search Report and Written Opinion issued in International Application No. PCT/US2014/040052", Sep. 30, 2014, 1-71.

Hoglund, et al., "Interconnecting Low-Power Wireless and Power-Line Communications using IPv6", poster abstract, retrieved from http://soda.swedish-ict.se/4060/, Nov. 2, 2010, 1-2.

Lampreia, "International Search Report and Written Opinion issued in International Application No. PCT/US2014/040058,", Sep. 18, 2014, 1-128.

Ly, "Office Action issued in copending U.S. Appl. No. 13/960,701, filed Aug. 6, 2013", Mar. 4, 2015, 1-9.

Mohri, "International Preliminary Report on Patentability issued in International Application No. PCT/US2014/040058,", mailed Feb. 18, 2016, 1-8.

Nakamura, "International Preliminary Report issued in International Application No. PCT/US2014/040052", mailed Feb. 18, 2016, 1-7.

Nickitas-Etienne, "International Preliminary Report on Patentability issued in International Application No. PCT/US2014/040043", mailed Feb. 18, 2016, 1-7.

Vasseur, et al., "Routing Metrics used for Path Calculation in Low Power and Lossy Networks", internet draft, Internet Engineering Task Force, IETF, Mar. 1, 2011, 1-30.

U.S. Appl. No. 14/543,880 to Hui et al. filed Nov. 17, 2014.

U.S. Appl. No. 14/873,033 to Hui et al. filed Oct. 1, 2015.

Choi, "Office Action issued in Canadian Application No. 2,920,018", mailed Aug. 31, 2016, 4 pages.

Takagi, et al., "Office Action issued in Japanese Application No. 2016-520162", mailed Jul. 11, 2016, 3 pages.

Tran, "Office Action issued in U.S. Appl.. No. 14/543,880, filed Nov. 17, 2014", Jun. 23, 2016, 1-13.

Yoshimura, "Office Action issued in Japanese Application No. 2016-520583", mailed Jul. 25, 2016, 3 pages.

Ly, "Office Action issued in U.S. Appl. No. 14/873,033, filed Oct. 1, 2015", mailed Nov. 18, 2016, 7 pages.

* cited by examiner

INTERLEAVING LOW TRANSMISSION POWER AND MEDIUM TRANSMISSION POWER CHANNELS IN COMPUTER NETWORKS

CROSS-REFERENCE TO RELATED APPLICATIONS

This patent application is a continuation of and claims priority to U.S. patent application Ser. No. 13/960,663, filed Aug. 6, 2013 and entitled "Interleaving Low Transmission Power and Medium Transmission Power Channels in Computer Networks." The entire contents of the above-identified priority application are hereby fully incorporated herein by reference.

TECHNICAL FIELD

The present disclosure relates generally to computer networks and, more particularly, to improving the efficiency and effectiveness in a multiple interface network.

BACKGROUND

Constrained networks include, for example, Low power and Lossy Networks (LLNs), such as sensor networks. These constrained networks have a myriad of applications, such as Smart Grid, Smart Cities, home and building automation, etc. Various challenges are presented with LLNs, such as lossy links, low bandwidth, battery operation, low memory and/or processing capability, etc. Large-scale internet protocol (IP) smart object networks pose a number of technical challenges. For instance, the degree of density of such networks (such as Smart Grid networks with a large number of sensors and actuators, smart cities, or advanced metering infrastructure (AMI) networks) may be extremely high. For example, it is not rare for each node to see several hundreds of neighbors. This architecture is particularly problematic for LLNs, where constrained links can wreak havoc on data transmission.

Network deployments utilize a number of different link technologies, including RF, Power line Communications (PLC), and cellular. Each link technology provides its own set of strengths and weaknesses. Devices in these networks typically communicate only via one of these technologies and are commonly referred to as "singly-PHY" devices. An alternative approach is to use network devices that support multiple link technologies simultaneously. Devices in these networks are commonly referred to as "multi-PHY" or "multiple interface" devices. For example, the network devices may support RF and PLC communication interfaces. In certain example devices, devices in these networks utilize a single link technology but differ in the transmission power used by each device. For example, some devices may transmit primarily using low-power transmission channels, other devices may communicate primarily using medium-power transmission channels, and yet other devices may transmit using a combination of medium-power and low-power transmission channels.

Networks are often constrained by regulatory compliance. For example, certain transmission powers (such as "medium" or "low" transmission powers) may be designated for specified channels within each network, and the devices or nodes within the network typically communicate using a channel-hopping link layer. The recipient device determines the channel-hopping schedule, and the sender device must then synchronize with the recipient device and transmit according to the recipient device's channel-hopping schedule.

DESCRIPTION OF EXAMPLE EMBODIMENTS

Overview

Figure 1:
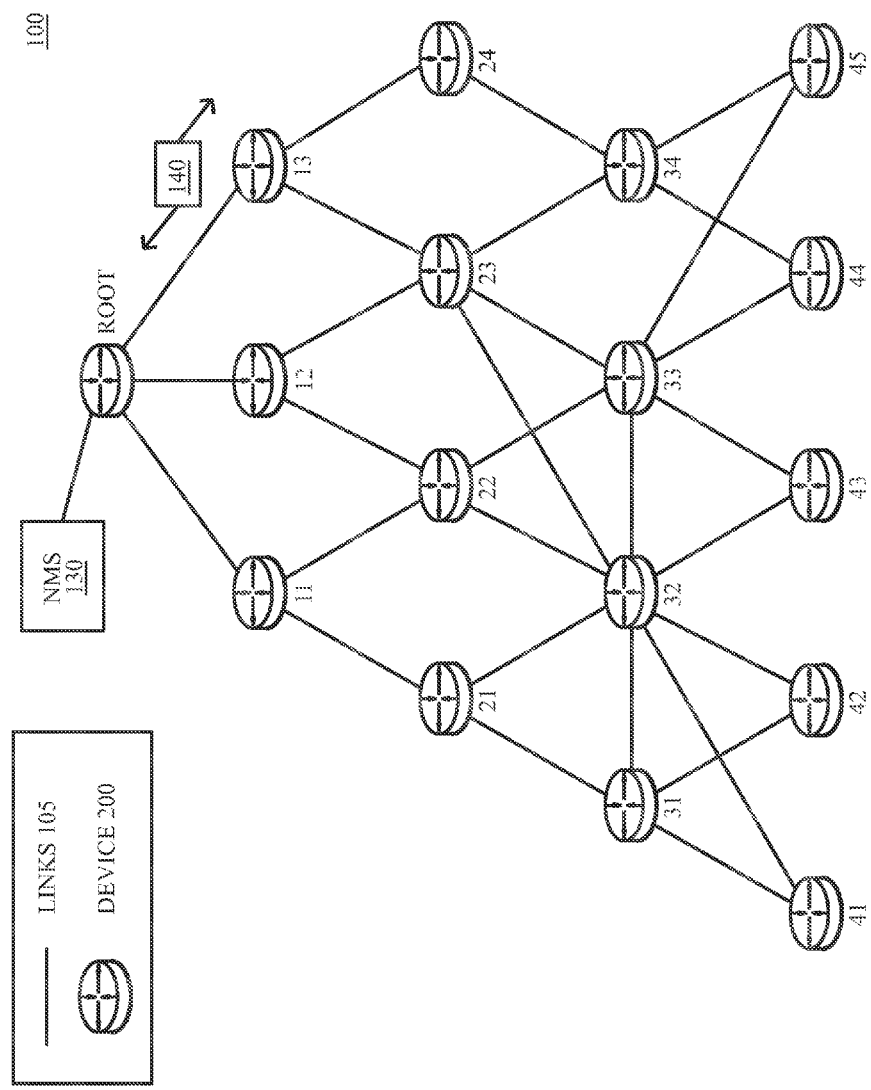
FIG. 1 is a diagram depicting an example communication network in accordance with certain example embodiments.

According to one or more embodiments of the disclosure, in a multi-interface, low power and lossy network (LLN) comprising a plurality of nodes, a low transmission power and a medium transmission power topology are defined for the network, and a channel-hopping schedule is defined for the devices operating in each topology. A sender device determines that a data packet is capable of being transmitted via a link on the low transmission power topology. In example embodiments, the sender device determines the transmission parameters for the transmission of the data over the low transmission power channel and transmits the transmission parameters to a receiver device over a link on the medium transmission power topology. The sender device determines a channel for transmission of the data and transmits the determined channel or channel hopping schedule to the receiver device. The receiver device switches to the designated low-power channel or channel hopping schedule and sender device transmits the data to the receiver device over the designated low-power channel or channel hopping schedule.

Description

Referring to the drawings, in which like numerals represent like (but not necessarily identical) elements throughout the figures, example embodiments are described.

A computer network is a geographically distributed collection of nodes interconnected by communication links and segments for transporting data between end nodes. Nodes and end nodes include, for example, personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network that is generally considered a self-configuring network of mobile routes (and associated hosts) connected by wireless links, the union of which forms an arbitrary topology.

Smart object networks, such as sensor networks, are a specific type of network having spatially distributed autonomous devices, such as sensors, actuators, etc., that cooperatively monitor physical or environmental conditions at different locations, such as, for example, energy/power consumption, resource consumption (for example, water/gas/etc. for advanced metering infrastructure or "AMI" applications), temperature, pressure, vibration, sound, radiation, motion, pollutants, etc. Other types of smart objects include actuators, for example, responsible for turning on/off an engine or performing any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port (such as PLC), a microcontroller, and an energy source (such as a battery). Often, smart object networks are considered field area networks (FANs), neighborhood area networks (NANs), etc. Generally, size and cost constraints on smart object nodes (for example, sensors) result in corresponding constraints on resources, such as energy, memory, computational speed, and bandwidth.

Mesh networks have become increasingly popular and practical in recent years. In particular, shared-media mesh networks, such as wireless or PLC networks, etc., are often on what is referred to as Low Power and Lossy Networks (LLNs). LLNs are a class of network in which both the routers and their interconnects are constrained: LLN routers typically operate with constraints (for example, processing power, memory, and/or energy (battery)), and their interconnects are characterized by, illustratively, high loss rates, low data rates, and/or instability. LLNs are comprised of any range from a few dozen or up to thousands or even millions of LLN routers and support point-to-point traffic (between devices inside the LLN), point-to-multipoint traffic (from a central control point, such as the root node, to a subset of devices inside the LLN), and multipoint-to-point traffic (from devices inside the LLN towards a central control point).

Loosely, the term "Internet of Things" or "IoT" may be used by those in the network field to refer to uniquely identifiable objects (things) and their virtual representations in a network-based architecture. In particular, the next frontier in the evolution of the Internet is the ability to connect more than just computers and communications devices, but also the ability to connect "objects" in general, such as lights, appliances, vehicles, HVAC (heating, ventilating, and air-conditioning), windows, window shades, and blinds, doors, locks, etc. The "Internet of Things" thus generally refers to the interconnection of objects (for example, smart objects), such as sensors and actuators, over a computer network (for example, internet protocol ("IP")), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, building and industrial automation, and cars (for example, that can interconnect millions of objects for sensing things like power quality, tire pressure, and temperature, and that can actuate engines and lights), it has been of the utmost importance to extend the IP protocol suite for these networks.

FIG. 1 is a schematic block diagram of an example computer network 100 illustratively comprising nodes/devices 200 (for example, labeled as shown, "root," "11," "12," . . . "45," and described in FIG. 2 below) interconnected by various methods of communication. For instance, the links 105 may be wired links or shared media (for example, wireless links, PLC links, etc.) where certain nodes 200 (such as, for example, routers, sensors, computers, etc.) may be in communication with other nodes 200, for example, based on distance, signal strength, current operational status, location, etc. Those skilled in the art will understand that any number of nodes, devices, links, etc. may be used in the computer network and that the view illustrated herein is for simplicity. Also, those skilled in the art will further understand that while the network is shown in a certain orientation, particularly with a "root" node, the network 100 is merely an example illustration that is not meant to limit the disclosure. In addition, a network management server (NMS) 130, or other head-end application device located beyond the root device (for example, via a WAN), may also be in communication with the network 100.

Data packets 140 (for example, traffic and/or messages sent between the devices/nodes) may be exchanged among the nodes/devices of the computer network 100 using predefined network communication protocols, such as certain known wired protocols, wireless protocols (for example, IEEE Std. .15.15.4, WiFi, Bluetooth®, etc.), PLC protocols, or other shared-media protocols where appropriate. In this context, a protocol comprises of a set of rules defining how the nodes interact with each other.

Figure 2:
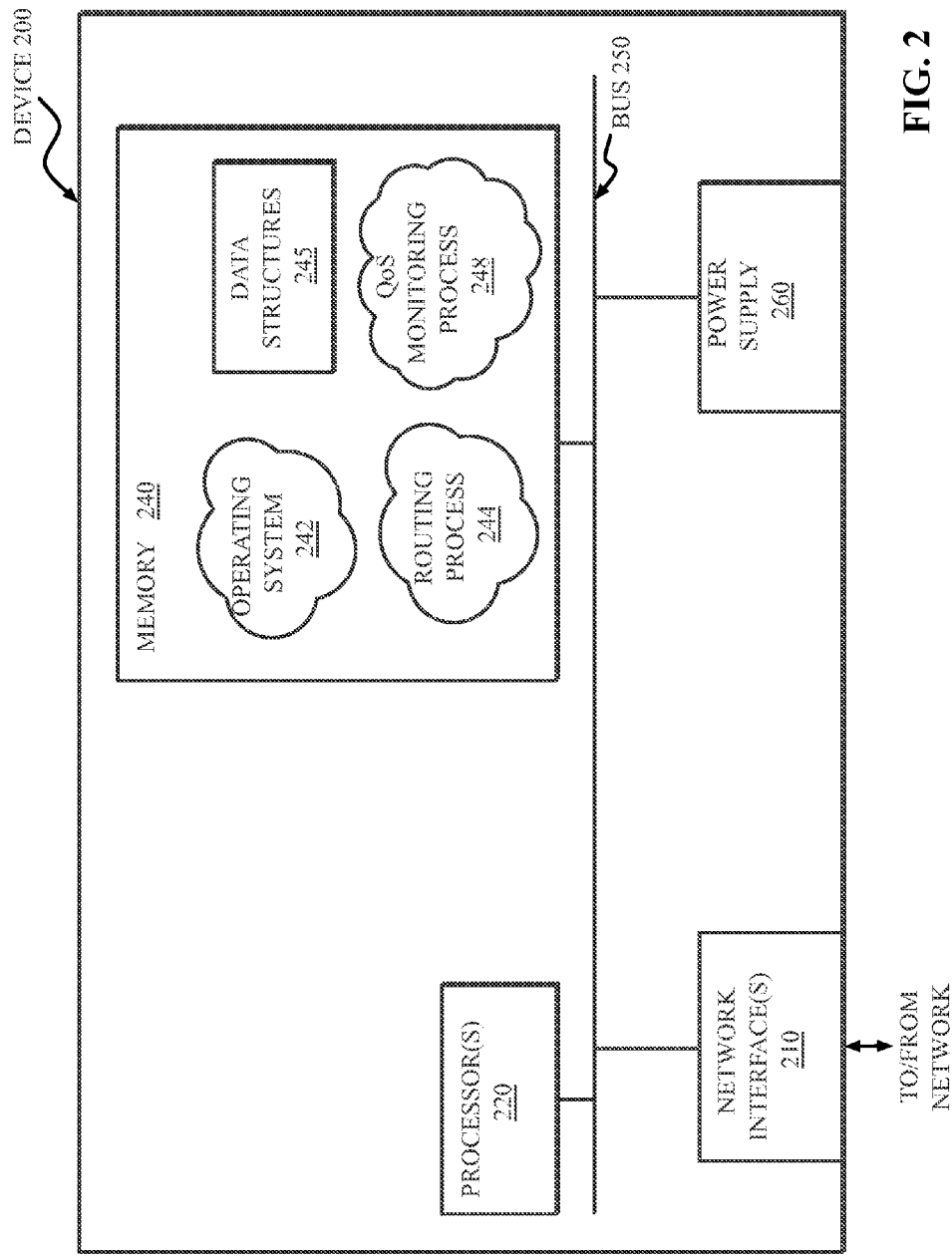
FIG. 2 is a block diagram depicting an example network device/node in accordance with certain example embodiments.

FIG. 2 is a schematic block diagram of an example node/device 200 that may be used with one or more embodiments described herein, for example, as any of the nodes shown in FIG. 1 above. The device 200 may comprise one or more network interfaces 210 (for example, wired, wireless, PLC, etc.), at least one processor 220, and a memory 240 interconnected by a system bus 250, as well as a power supply 260 (for example, battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have multiple types of network connections 210, for example, wireless and wired/physical connections, and that the view depicted herein is merely for illustration. Also, while the network interface 210 is shown separately from the power supply 260, the network interface 210 may communicate through the power supply 260 or may be an integral component of the power supply, for example, for PLC. In some specific configurations, the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (for example, no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor 220, functionally organizes the device by, inter alia, invoking operations in support of software processes and/or services executing on the device. These software processes and/or services may comprise routing process/services 244 and an illustrative "QoS monitoring" process 248, as described herein. Note that while QoS monitoring process 248 is shown in centralized memory 240, alternative embodiments provide for the process to be specifically operated within the network interfaces 210, such as a component of a network layer operation within the network interfaces 210 (as process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (for example, according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, for example, data used to make routing/forwarding decisions. In particular, in proactive routing, connectivity is discovered and known prior to computing routes to any destination in the network, for example, using link state routing such as Open Shortest Path First (OSPF), Intermediate-System-to-Intermediate-System (ISIS), or Optimized Link State Routing (OLSR). Reactive routing, on the other hand, discovers neighbors (in other words, it does not have an a priori knowledge of network topology) and, in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), for example, certain sensor networks, may be used in a myriad of applications, such as for "Smart Grid" and "Smart Cities." A number of challenges in LLNs have been presented, such as:
1) Links are generally lossy, such that a Packet Delivery Rate/Ratio (PDR) can dramatically vary due to various sources of interferences, for example, considerably affecting bit error rate (BER);
2) Links are generally low bandwidth, such that control plane traffic must generally be bounded and negligible compared to the low rate data traffic;
3) A number of use cases require specifying a set of link and node metrics, some of them being dynamic, thus requiring specific smoothing functions to avoid routing instability, which considerably drains bandwidth and energy;
4) Constraint-routing may be required by some applications, for example, to establish routing paths that will avoid non-encrypted links, nodes running low on energy, etc.;
5) Scale of the networks may become very large, for example, on the order of several thousands to millions of nodes; and
6) Nodes may be constrained with low memory, a reduced processing capability, a low power supply (for example, battery), etc.

In other words, LLNs are a class of network in which both the routers and their interconnect are constrained: LLN routers typically operate with constraints, for example, processing power, memory, and/or energy (battery), and their interconnects are characterized by, illustratively, high loss rates, low data rates, and/or instability. LLNs are comprised of anything from a few dozen and up to thousands or even millions of LLN routers. Additionally, LLNs support point-to-point traffic (between devices inside the LLN), point-to-multipoint traffic (from a central control point to a subset of devices inside the LLN), and multipoint-to-point traffic (from devices inside the LLN towards a central control point).

An example implementation of LLNs is an "Internet of Things" network. As described above, the term "Internet of Things" or "IoT" may be used by those in the art to refer to uniquely identifiable objects (things) and their virtual representations in a network-based architecture. In particular, the term "IoT" generally refers to the interconnection of objects (for example, smart objects), such as sensors and actuators, over a computer network (for example, IP), which may be the Public Internet or a private network. Such devices have been used in the industry for decades, usually in the form of non-IP or proprietary protocols that are connected to IP networks by way of protocol translation gateways. With the emergence of a myriad of applications (for example, smart grid, smart cities, building and industrial automation, etc.), it has been of the utmost importance to extend the IP protocol suite for these networks.

One example protocol is specified in Internet Engineering Task Force (IETF) Proposed Standard, Request for Comment (RFC) 6550, entitled "RPL: IPv6 Routing Protocol for Low Power and Lossy Networks" by Winter, et al. (March 2012). This protocol provides a mechanism that supports multipoint-to-point (MP2P) traffic from devices inside the LLN towards a central control point (for example, LLN Border Routers (LBRs) or "root nodes/devices" generally), as well as point-to-multipoint (P2MP) traffic from the central control point to the devices inside the LLN (and also point-to-point or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (for example, "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, in other words, at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (for example, the farther away a node is from a root, the higher the rank of that node). Further, in certain embodiments, a sibling of a node within a DAG may be defined as any neighboring node that is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (for example, by a DAG process) based on an Objective Function (OF). The role of the objective function is generally to specify rules on how to build the DAG (for example, number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. Alternatively, the constraints and metrics may be separated from the objective function. Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc. are considered "DAG parameters."

Illustratively, example metrics used to select paths (for example, preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (for example, wired, wireless, etc.), etc. The objective function may provide rules defining the load balancing requirements, such as a number of selected parents (for example, single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example objective function (for example, a default objective function) may be found in an IETF RFC, entitled "RPL Objective Function 0"<RFC 6552> by Thubert (March 2012 version) and "The Minimum Rank Objective Function with Hysteresis"<RFC 6719> by O. Gnawali et al. (September 2012 version).

Building a DAG may utilize a discovery mechanism to build a logical representation of the network and a route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, for example, following the orientation of the edges within the DAG. Conversely, "downward" or "down" paths are routes that lead in the direction from DAG roots towards leaf nodes, for example, generally going in the opposite direction to the upward messages within the DAG.

Generally, a DAG discovery request (for example, DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (for example, DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
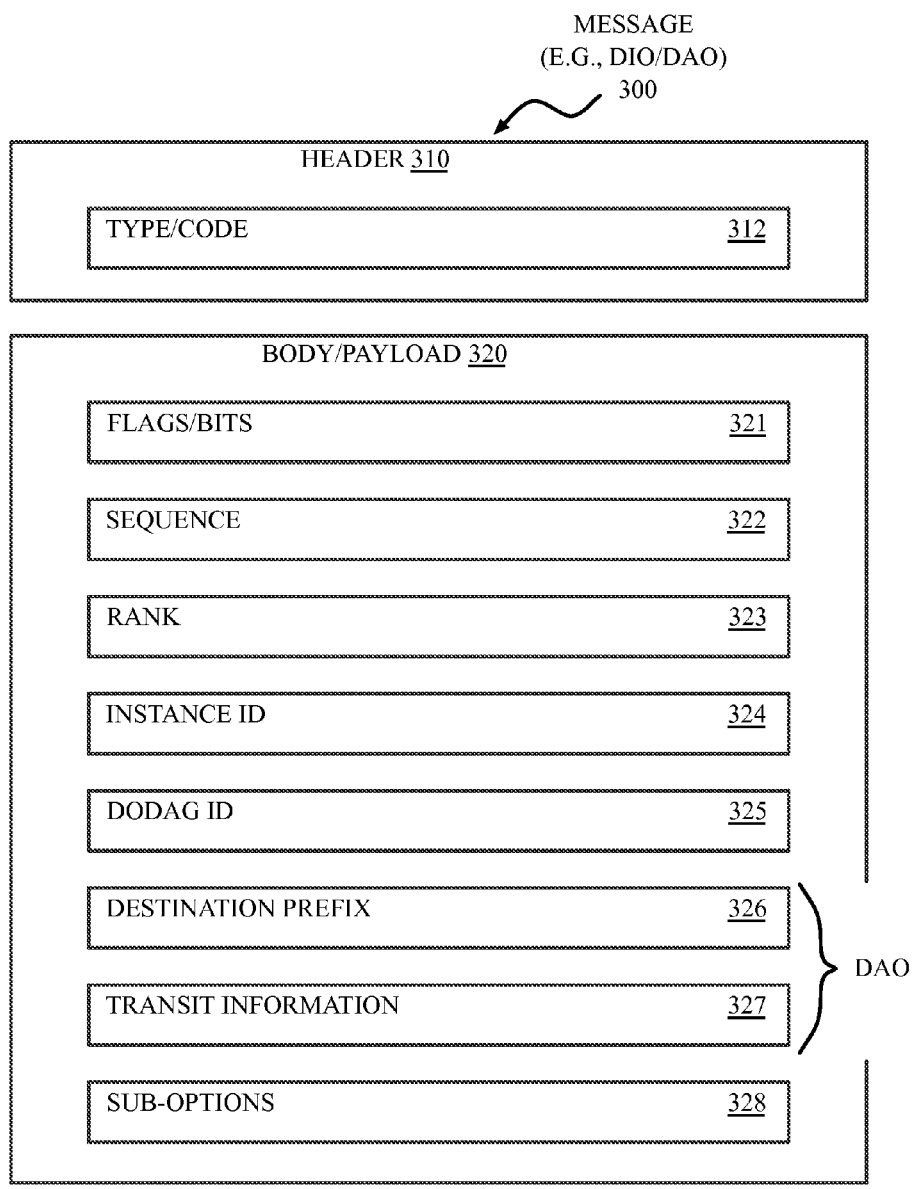
FIG. 3 is a block diagram depicting packet header and payload organization in accordance with certain example embodiments.

FIG. 3 illustrates an example simplified control message format 300 that may be used for discovery and route dissemination when building a DAG, for example, as a DIO, DAO, or DIS message. Message 300 illustratively comprises a header 310 with one or more fields 312 that identify the type of message (for example, a RPL control message) and a specific code indicating the specific type of message, for example, a DIO, DAO, or DIS. Within the body/payload 320 of the message may be a plurality of fields used to relay pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (for example, DAO_Sequence used for acknowledgements (ACKs), etc.). For any type of message 300, one or more additional sub-option fields 328 may be used to supply additional or custom information within the message 300. For instance, an objective code point (OCP) sub-option field may be used within a DIO to carry codes specifying a particular objective function to be used for building the associated DAG. Alternatively, sub-option fields 328 may be used to carry other information within a message 300, such as indications, requests, capabilities, lists, notifications, etc., for example, in one or more type-length-value (TLV) fields.

Figure 4:
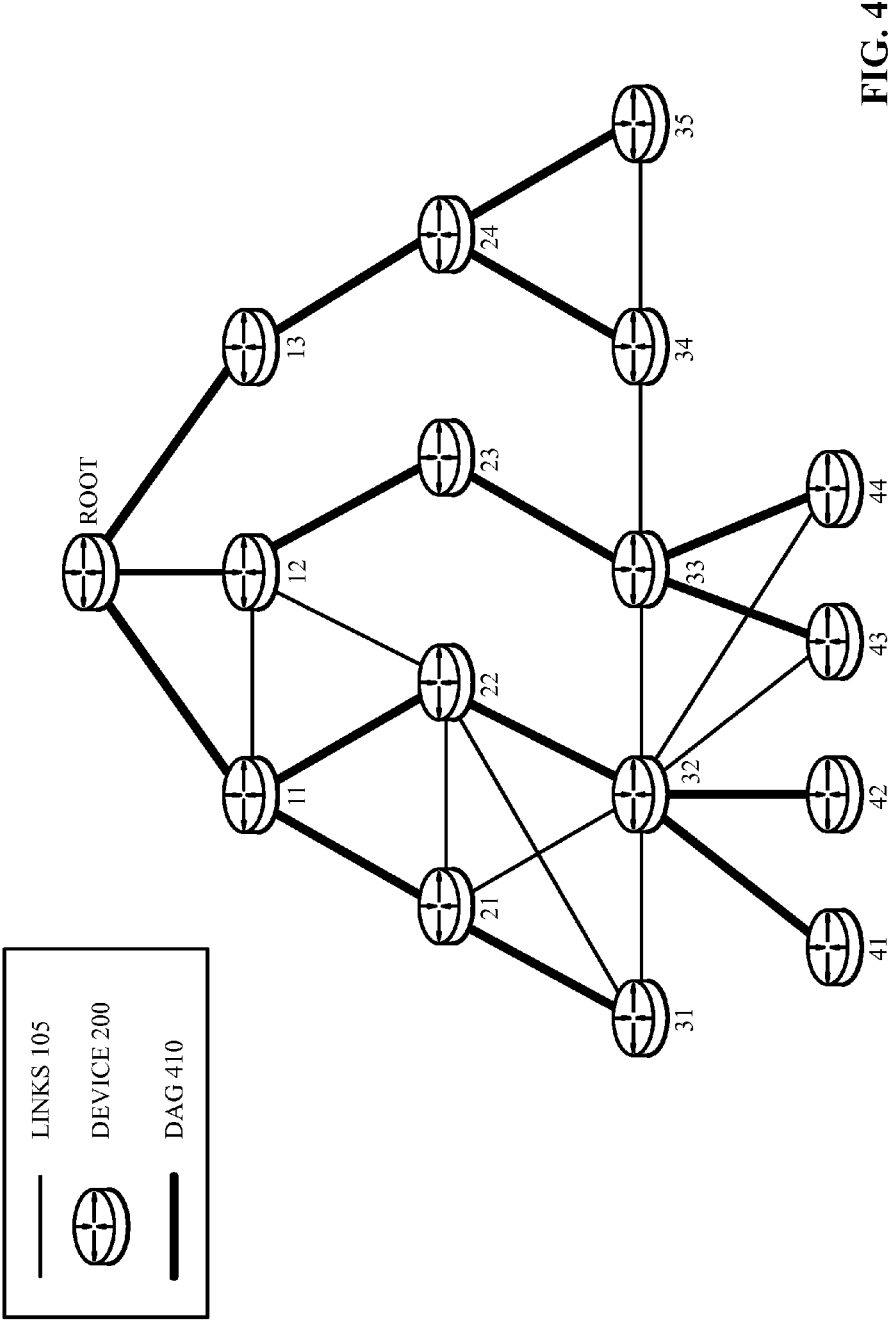
FIG. 4 is a diagram depicting a directed acyclic graph defined within a computer network in accordance with certain example embodiments.

FIG. 4 illustrates an example simplified DAG that may be created, for example, through the techniques described above, within the network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein. Note that although certain examples described herein relate to DAGs, the embodiments of the disclosure are not so limited and may be based on any suitable routing topology, particularly for constrained networks.

As noted above, shared-media communication networks, such as wireless and power-line communication (PLC) networks (a type of communication over power-lines), provide an enabling technology for networking communication and can be used for example in Advanced Metering Infrastructure (AMI) networks, and are also useful within homes and buildings. Interestingly, PLC lines share many characteristics with low power radio (wireless) technologies. In particular, though each device in a given PLC network may be connected to the same physical power-line, due to their noisy environment, a PLC link provides limited range and connectivity is highly unpredictable, thus requiring multi-hop routing when the signal is too weak. For instance, the far-reaching physical media exhibits a harsh noisy environment due to electrical distribution transformers, commercial and residential electric appliances, and cross-talk effects. As an example, even within a building, the average number of hops may be between two and three (even larger when having cross phases), while on an AMI network on the same power phase line the number of hops may vary during a day between one and 15-20. Those skilled in the art would thus recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

Furthermore, such communication links are usually shared (for example, by using wireless mesh or PLC networks) and provide a very limited capacity (for example, from a few Kbits/s to a few dozen Kbits/s). LLN link technologies typically communicate over a physical medium that is strongly affected by environmental conditions that change over time. For example, LLN link technologies may include temporal changes in interference (for example, other wireless networks or electric appliances), spatial/physical obstruction (for example, doors opening/closing or seasonal changes in foliage density of trees), and/or propagation characteristics of the physical media (for example, changes in temperature, humidity, etc.). The timescale of such temporal changes may range from milliseconds (for example, transmissions from other wireless networks) to months (for example, seasonal changes of outdoor environment). For example, with a PLC link the far-reaching physical media typically exhibits a harsh noisy environment due to a variety of sources including, for example, electrical distribution transformers, commercial and residential electric appliances, and cross-talk effects. Real world testing suggests that PLC link technologies may be subject to high instability. For example, testing suggests that the number of hops required to reach a destination may vary between 1 and 17 hops during the course of a day, with almost no predictability. It has been observed that RF and PLC links are prone to a number of failures, and it is not unusual to see extremely high Bit Error Rates (BER) with packet loss that may be as high as 50-60%, coupled with intermittent connectivity.

As further noted above, many LLNs, particularly AMI networks, demand that many different applications operate over the network. For example, the following list of applications may operate simultaneously over AMI networks:
1) Automated Meter Reading that involves periodically retrieving meter readings from each individual meter to a head-end server;
2) Firmware upgrades, for example, that involve communicating relatively large firmware images (often 500 KB or more) from a head-end server to one device, multiple devices, or all devices in the network;
3) Retrieving load curves;
4) Real-time alarms generated by meters (for example, power outage events) that actually act as sensors;
5) Periodically retrieving network management information from each meter to a Network Management System (NMS) 130;
6) Supporting demand response applications by sending multicast messages from a head-end device to large numbers of meters;
7) Etc.

One of skill in the art will appreciate that the above-enumerated examples are similar for other types of LLNs.

Generally speaking, these different applications have significantly different traffic characteristics, for example, unicast vs. multicast, small units of data vs. large units of data, low-latency vs. latency-tolerant, flows toward a head-end vs. away from the head-end, etc. Furthermore, since these applications must operate simultaneously over a highly constrained LLN network, the network can easily experience congestion, especially when different applications are sending traffic simultaneously. For example, the bandwidth of LLN links may be as low as a few Kbits/s, and even lower when crossing transformers (for PLC). Without proper mechanisms, these situations can cause networks to violate critical service level agreements (SLAs), for example, delaying the reception of critical alarms from a meter. Accordingly, Quality of Service (QoS) mechanisms are a critical functionality in shared-media communication networks, particularly in highly constrained LLNs.

Numerous QoS mechanisms have been developed for "classic" IP networks (unconstrained), including: (1) packet coloring and classification (for example, by applications or Edge network entry points), (2) congestion avoidance algorithms with random drops for back-pressure on Transmission Control Protocol (TCP) (for example, WRED, etc.), (3) queuing techniques (for example, preemptive queuing+ round robin+dynamic priorities), (4) bandwidth reservation (for example, Diffsery (by CoS), Intsery (RSVP(-TE), etc.), (5) Input/Output shaping (for example, congestion-based traffic shaping), (6) Call Admission Control (CAC) using protocols such as the Resource reSerVation Protocol (RSVP) and/or input traffic shapers, (7) Traffic Engineering, (8) Congestion Avoidance techniques, etc. However, while some of these techniques may apply to LLNs, most are not suitable because they are too costly in terms of bandwidth (control plane overhead), memory (state maintenance), and/or CPU processing. Indeed, policies must be specified for packet coloring, and queuing techniques and congestion avoidance algorithms, such as WRED, must be configured on nodes. Such algorithms require a deep knowledge of traffic patterns, link layer characteristics, and node resources with respect to a number of parameters to configure each individual device.

Figure 5:
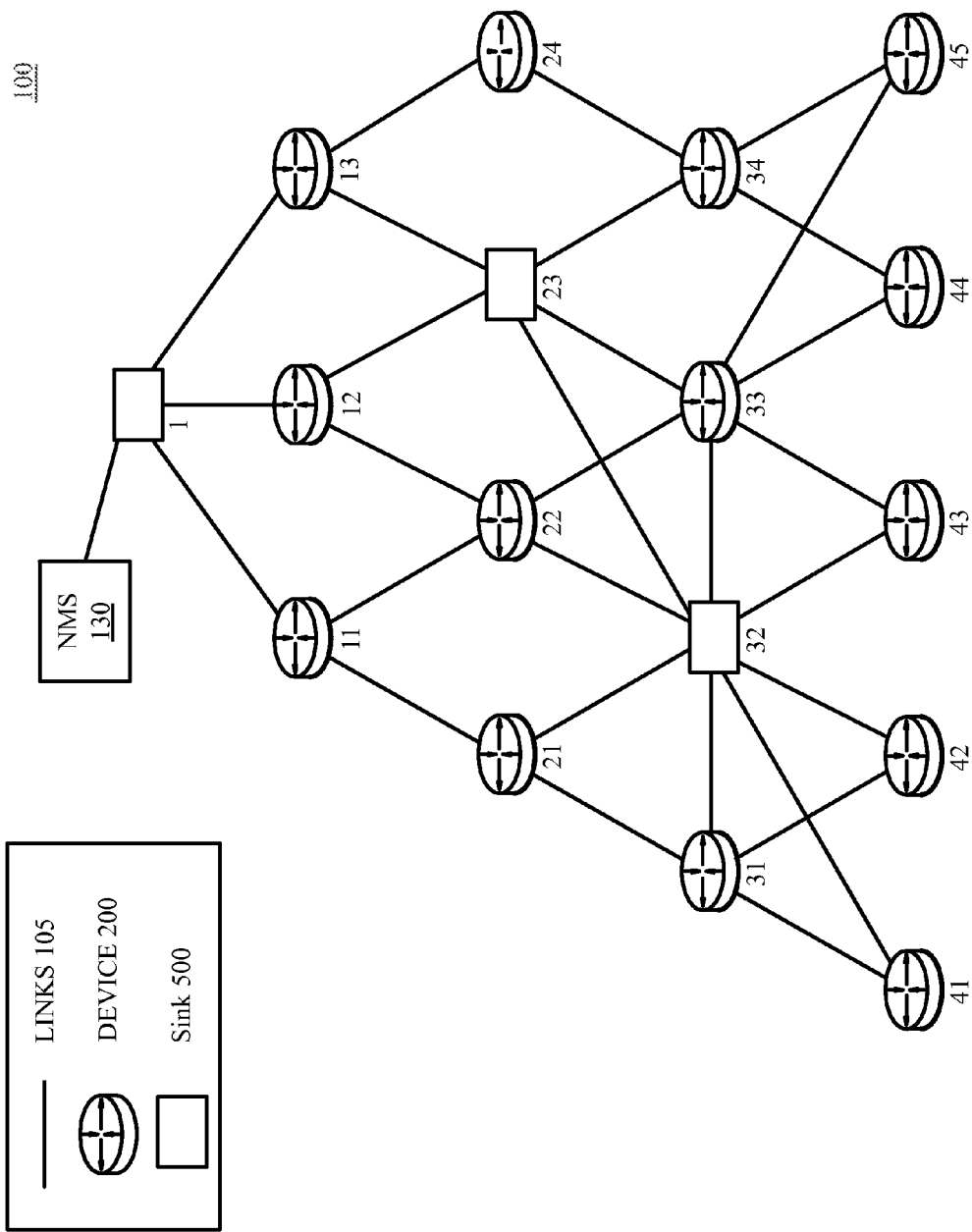
FIG. 5 is a block diagram depicting an example communication network in accordance with certain alternative example embodiments.

Although the techniques described herein are illustrated with respect to an LLN in which network traffic transits through the root/LBR, it should be noted that the techniques described herein may be generally applied to any network, particularly to any constrained network. For example, as shown in FIG. 5, a network 100 that does not have a central node through which all traffic is piped (for example, like the LBR of an LLN), may have one or more sinks 500 that reside at strategic locations throughout the network (for example, nodes 1, 23, and 32) to ensure that all potential traffic within the network may be monitored and routed according to the techniques described herein. In such an environment, the sinks may operate independently or in collaboration (for example, with each other or with an NMS) to perform the techniques described herein.

The techniques described herein may be performed by hardware, software, and/or firmware, such as in accordance with the "QoS monitoring" process 248/248a shown in FIG. 2, which may contain computer executable instructions executed by the processor 220 (or independent processor of interfaces 210) to perform functions relating to the techniques described herein, for example, in conjunction with routing process 244. For example, the techniques herein may be treated as extensions to conventional protocols, such as the various PLC protocols or wireless communication protocols, and as such, may be processed by similar components understood in the art that execute those protocols.

Interleaving Low Transmission Power and Medium Transmission Power Channels for Smart Utility Networks LLNs communicate using media that is federally regulated. In the United States, the Federal Communications Commission (FCC) regulates the use of radio frequency bands. One important purpose for federal regulations is to ensure that devices can efficiently share the communication media. Unfortunately, such regulations can vary significantly with each country, driving the need for different networking architectures, protocols, and algorithms. In an example embodiment, such regulations restrict communications based on transmit power, transmission duration, carrier sense time, pause duration between transmissions, and/or duty cycle. For example, the FCC places duty-cycle (for instance, <400 ms in 20 s) and channel-hopping (for instance, uniform random channel selection) restrictions in the 915 MHz band.

In Japan, the Association of Radio Industries and Businesses (ARIB) regulates the use of the radio spectrum. ARIB allocated spectrum in the 920 MHz band for use with Smart Utility Networks (SUN) in Japan. ARIB regulates transmissions by specifying send duration, pause duration, and sums of emission time per arbitrary 1 hour. The specifications depend on the transmission power and channel bandwidth for the transmission. For example, ARIB places the following restrictions with channel BW=200 kHz:

1) For "medium" transmission power (>20 mW and <250 mW):
   A) In the 920.5-922.3 MHz band, carrier sense of >5 ms, sending duration <4 s, pause duration >50 ms, no emission time limit per arbitrary hour.
   B) In the 922.3-923.5 MHz band, carrier sense of >128 µs, sending duration <400 ms, emission time <360 s per arbitrary hour.
2) "Low" transmission power (<20 mW):
   A) In the 920.5-923.5 MHz band, carrier sense of >5 ms, sending duration <4 s, pause duration >50 ms, no emission time limit per arbitrary hour.
   B) In the 922.3-928.1 MHz band, carrier sense of >128 µs, sending duration <400 ms, emission time <360 s per arbitrary.

In both examples above, with carrier sense <5 ms, the pause duration is dependent on the transmission duration. With the transmission duration between >200 ms and <400 ms, pause duration is ten times or more of the former transmission duration. With the transmission duration between >6 ms and <200 ms, pause duration is 2 ms. With the transmission duration <6 ms, no pause duration is required.

Notable differences exist between the ARIB regulations and the FCC regulations. For example, the ARIB regulations offer two different transmission powers. Medium transmission power offers greater range but fewer channels (15 channels vs. 38 channels). In contrast, FCC specifies a single transmission limit across the entire frequency band. In another example, the ARIB regulations provide that lower frequency channels have different transmission parameters than higher frequency channels. The lower frequency channels are shared with prioritized passive tags systems. Lower frequency channels have a longer carrier-sense time, but also a longer duration time and no emission time limit per arbitrary hour. In contrast, the FCC regulations specify uniform parameters across the entire frequency band. In yet another example, the ARIB regulations provide that the low transmission power has an overlap in transmission parameters in the 922.3-928.1 MHz band, offering the ability to support either depending on the carrier sense duration.

LLNs typically communicate using a channel-hopping link layer. This requirement is driven both by regulatory compliance and to achieve better spectral efficiency. In an example embodiment, a network (for example, a Connected Grid Mesh (CG-Mesh)) implements the channel-hopping approach. Each network interface determines its own unicast receive schedule. Neighboring devices must synchronize with its unicast schedule to properly communicate a unicast frame. By having each device determine its own schedule independently, neighboring transmitter-receiver pairs can communicate simultaneously on different channels. In an example embodiment, the network also overlays a network-wide broadcast schedule, where all devices are synchronized to the same channel-hopping schedule. The broadcast schedule is only active for a fraction of the time (for example, 25%), but it allows efficient broadcasts since a single transmission can reach an arbitrary number of neighbors. In an example embodiment, this hybrid approach allows the network to maximize spectral efficiency for unicast communication while also allowing efficient broadcast communication.

According to the techniques described herein, a link layer mechanism is provided for utilizing medium and low transmit powers in a single LLN. For example, devices default to using only the medium transmission power channels for the standard channel-hopping schedule. However, when a device determines that it is possible to transmit to a neighbor using low transmission power, it may dynamically send a message requesting the neighbor to temporarily switch to using lower transmit power channels to take advantage of the additional channel diversity.

In an example embodiment, the receiver device listens on channels usable for medium transmission power (for example, ARIB channels 23-38 in the 920 MHz band). In this embodiment, the devices use a standard channel-hopping schedule that involves using a random sequence from the medium transmission power channels. The standard channel-hopping schedule allows the receiver device to receive medium transmission power transmissions from any neighbor at any time, maximizing the signal-to-noise ratio (SNR) and communication range between all devices in the LLN.

In another example embodiment, a new control message is transmitted that instructs the receiving device to listen on a different channel or channel-hopping sequence. A sender device determines that it can communicate with a neighbor using a low transmission power channel. It transmits a control message to the receiver device specifying the low transmission power channel or low transmission power channel hopping sequence, and then transmits the data message on that low-power channel. By sending a control message, the cost of sending a large data packet can be incurred on a different channel. In one embodiment, the control message may indicate the channel on which to listen long enough to detect a Start-of-Frame Delimiter (SFD). In another embodiment, the control message may indicate how long to listen on the channel, allowing the transmission of multiple data frames back-to-back. In yet another embodiment, the control message may indicate a low transmission power channel-hopping sequence or schedule to use for a limited period of time. The control message may also comprise other transmission parameters (for example, data rate and modulation).

In yet another example embodiment, an acknowledgement message is transmitted in response to the control message. In this embodiment, if the sender device does not receive a control message acknowledgment, then it can avoid wasting transmission time for the data packet itself. In one embodiment, the acknowledgment message may be sent back on the same channel that the control message was sent. In another embodiment, the acknowledgment message may be sent back using the channel-hopping sequence indicated in the control message. In yet another embodiment, the acknowledgment message may be sent back on the low transmission power channel, making better use of the increased channel diversity.

In yet another example embodiment, the devices dynamically choose whether or not to transmit on a low transmission power channel. In one embodiment, the devices determine whether or not to transmit on a low transmission power channel based on the expected latency. In this embodiment, sending a control message and optionally receiving an acknowledgment before sending the data packet can add significant communication latency. For high priority or latency sensitive packets, a device may choose to simply send the data packet using the medium transmission power channel. However, the medium transmission power channels may be tuned to a lower data rate to increase communication range and robustness. If a higher data rate is used when transmitting on low transmission power channels, the device must make a cost-benefit tradeoff for switching to a low transmission power channel. In such cases, it may still be beneficial to use a low transmission power channel especially when the data packet is large.

In another example embodiment, the devices determine whether or not to transmit on a low transmission power channel based on the link quality. Sending on a low transmission power channel may reduce range and robustness. In one embodiment, the receiver may evaluate the received signal strength indicator (RSSI) or location/quality indicator (LQI) of the control message and indicate in the acknowledgement message whether or not the sender device should switch to a low transmission power channel for transmission of the data message. In another embodiment, the control message and/or data message acknowledgement message may include link quality information (for example, RSSI and/or LQI) for the sender device to use in future transmissions. In both cases, a configurable threshold for one or more of the parameters is used to determine whether or not to use a low transmission power channel. In one embodiment, the threshold may be adjusted based on the packet's priority. In another embodiment, the threshold may be dynamically adjusted based on observed traffic metrics.

In an example embodiment, the devices dynamically select which medium-power channels to use in the default channel-hopping sequence. For example, the lower transmission power channels (for instance, ARIB channels 2332) have a much larger carrier-sense duration (>5 ms) than higher transmission power channels (for instance, ARIB channels 3338) with carrier-sense duration >128 μs. As a result, higher transmission power channels may be used to communicate higher priority traffic more successfully. Also, lower transmission power channels are shared with passive tag systems in the 920 MHz band. In one embodiment, the pseudo-random channel-hopping sequence may alternate between using lower transmission power channels and higher transmission power channels (for example, ARIB channels 2332 and 3338) on each slot, ensuring that a slot from each band/transmission power is separated by at most one slot. In another example embodiment, the pseudo-random sequence may change the ratio of lower/higher transmission power slots to change the capacity allocated to each kind of traffic. In an example embodiment, the pseudo-random sequence parameters may be a network-wide configuration carried in IEEE 802.15.4e Enhanced Beacons. In another example embodiment, the pseudo-random sequence is managed by one or more devices.

Residential meter reading and distribution automation (DA) applications have different network demands. For example, the number and density of residential meters is far greater than the number of DA endpoints. However, compared to residential metering applications, DA applications generally require lower latency communication and are preferred to operate during specific events, such as a power outage.

According to the techniques described herein, both low transmission power and medium transmission power channels are supported using the same radio hardware through channel-hopping. In an example embodiment, channel-hopping schedules are configured for each device based on the kind of traffic flow it supports. For example, devices that carry DA traffic are configured to use medium transmission power channels.

In an example embodiment, the channel-hopping sequence is split into two interleaved channel-hopping sequences. For example, rather than having a single channel-hopping sequence C(1), C(2), . . . , C(n), a new channel-hopping sequence Ca(1), Cb(1), Ca(2), Cb(2), . . . , Ca(n), Cb(n) is defined. Note that in this example, the channels alternate between each sequence. In an example embodiment, the allocation and periodicity can be arbitrary. For example, there can be three consecutive slots from sequence Ca(x) then only one slot from sequence Cb(x). In another example embodiment, the interleaving of channels does not have to follow a regular pattern. For example, the sequence may have two consecutive slots from Ca(x) and five consecutive slots from Cb(y). In another example embodiment, the channel-hopping schedule can include only Ca(x) or Cb(y) for a duration of time.

In an example embodiment, one channel-hopping sequence is used for low transmission power communications, and the other channel-hopping sequence is used for medium transmission power communications. In this embodiment, a single device may allow neighboring devices to transmit using either low transmission power or medium transmission power channels at different times. For example, Cl(x) represents the low transmission power channels and Cm(y) represents the medium transmission power channels. A nearby neighboring device may communicate using low communication power channels any time Cl(x) is active. A neighboring device further away may communicate using medium transmission power channels any time Cm(y) is active.

In another example embodiment, the channel-hopping sequence is communicated to a neighboring device. In an example embodiment, the information may be communicated in Information Elements (for example, when using IEEE 802.15.4e2012). The channel-hopping information may be encoded in a number of ways. For example, in ARIB Japan, the channel number defines the transmit output (i.e., low or medium). In addition, the device may provide more information about the channel-sequence function. For example, one channel-sequence function may generate fewer medium transmission power channels, and another channel-sequence function may generate more medium transmission power channels.

In another example embodiment, the network utilizes two non-overlapping broadcast schedules. For example, one broadcast schedule for low transmission power and another for medium transmission power. In another example embodiment, a network utilizes a single broadcast schedule that includes only medium transmission power channels. For example, this configuration may be statically configured or communicated in IEEE 802.15.4e2012 Enhanced Beacons. In another example, the configuration may be configured on the Field Area Router (FAR) or Network Management System (NMS). In another embodiment, this configuration may be automatically configured based on observed traffic characteristics.

In yet another example embodiment, the channel-hopping sequence is dynamically switching based on an event (for example, a power outage event). In this embodiment, a device that was listening to both low transmission power and medium transmission power channels may switch to a sequence with a higher proportion of medium transmission power channels during a specified event, such as a power outage event. For example, a device switches to listen on medium transmission power channels. This dynamic switch is beneficial in cases where utilities want to prioritize and increase robustness of traffic for DA devices.

In another example embodiment, marked packets are mapped to low transmission power or medium transmission power channels. In an example embodiment, the medium power transmission channels offer higher transmit power, but they do not offer as much channel diversity. To make effective use of low transmission power and medium transmission power channels, devices map the traffic to the different channels. For example, when using IPv6, the differentiated service code point (DSCP) markings map to low transmission power or medium transmission power channels. In one example embodiment, the mapping may be provided statically through configuration (for example, DHCPv6 or NMS registration). In another example embodiment, a device (either locally or centrally at the FAR/NMS) may observe the traffic that it is forwarding and dynamically map the traffic.

In an example embodiment, a network architecture is built that comprises: (1) residential meters listen using a channel-hopping schedule that includes only low transmission power channels (for example, any device transmitting to a residential meter transmits using low transmission power); (2) range extenders without BBUs that are primarily used to provide connectivity for residential meters listen using a channel-hopping schedule that includes only low transmission power channels (for example, any device transmitting to a range extender without a BBU uses a low transmission power channel); (3) DA Gateways listen using a channel-hopping schedule that includes a mixture of low transmission power and medium transmission power channels (for example, any device may transmit to a DA Gateway using either low transmission power or medium transmission power channels); and (4) range extenders with BBUs listen using a channel-hopping schedule that includes a mixture of low transmission power and medium transmission power channels (for example, any device may transmit to a range extender with BBU using either a low transmission power or medium transmission power channel).

In this embodiment, low transmission power channels are primarily used for connecting residential meters. Because low transmission power channels offer greater channel diversity due to larger bandwidth and spatial diversity due to reduced transmission power, they are well-suited for the expected high density of residential meters. Medium transmission power channels are primarily used for connected DA devices. Medium transmission power channels provide greater communication range and larger signal-to-noise ratio, offering lower latency and greater robustness. Residential metering traffic may communicate with DA Gateways and/or range extenders with BBUs when sending messages. They will typically only send messages using low transmission power channels but may also send messages using medium transmission power channels for any alarms or alerts. DA traffic utilizes only range extenders with BBUs and medium transmission power channels. Therefore, the link layer effectively allocates spectrum resources between the two different applications based on the capabilities of each device.

According to certain techniques described herein, a routing architecture that supports the different application requirements within the ARIB Japan regulations is provided. In an example embodiment, multiple routing topologies are constructed to utilize the different characteristics offered by different frequency ranges when transmitting on the same transceiver. However, the use of a topology need not be limited to the link type over which it was built. For example, a routing topology built over medium transmission power links may utilize low transmission power links where possible to reduce utilization of medium transmission power channels.

In an example embodiment, multiple routing topologies are built over the two channel-hopping sequences. For example, two routing topologies are defined. One for forwarding over low transmission power channels and another for forwarding over medium transmission power channels. When generating, programming is modified to mark the DIO packet to indicate whether the DIO message should be sent using a low transmission power or medium transmission power channel. In another example embodiment, all DIO messages are sent using medium transmission power channels since DIO messages are only used for discovering neighbors and propagating routing information.

In another example embodiment, devices dynamically switch to low transmission power links where possible to reduce the load on medium transmission power links that have less channel diversity and greater interference range. When building a medium transmission power topology, the RPL component may begin by using only medium transmission power links and establishing communication using medium transmission power channels. However, when evaluating link qualities (for example, by sending IPv6 NS, keep alives, etc.), the RPL component then determines whether or not low transmission power communication with neighboring devices is possible. If so, the RPL component may switch to the low transmission power links. As a result, the "medium transmission power topology" may utilize some links with low transmission power channels. By selecting low transmission power or medium transmission power links dynamically, a tradeoff can be found to provide desired characteristics, using low transmission power wherever possible, while preserving the DODAG optimality to satisfy the required SLA.

Note that the above components generalize to using additional PHY technologies (for example, PLC). For example, in TEPCO, where devices effectively support three different PHY layers (802.15.4 low transmission power, 802.15.4 medium transmission power, and P1901.2), three routing topologies can be constructed that utilize each of the three types of links. The two 802.15.4 links are virtual and provided by a single RF frontend. In an example embodiment, it is possible to dynamically switch to using a different PHY as long as the routing topology remains intact.

In another example embodiment, traffic is dynamically mapped to the different routing topologies. In one example embodiment, a device generates probes to determine communication characteristics (for example, latency) when routing across a topology. In another example embodiment, a device may include an IPv6 Option to mark the time of a packet. With either embodiment, the Field Area Router (FAR) or Network Management System (NMS) can determine which topologies support the required SLAs. For example, a routing topology using low transmission power channels may be better suited to forward low-latency traffic if the network diameter is small (i.e., low transmit power is not an issue) and the node density is high (i.e., greater channel diversity). Using this information, the FAR/NMS indicates to each node what topology (e.g., the IPv6 DSCP marking) to use when generating traffic. In another example embodiment, the FAR/NMS may indicate multiple topologies for use when using 1+1 or primary/backup techniques.

In an example embodiment, devices create multiple routing topologies using the different (virtual or physical) link technologies supported by a single RF frontend. When using different link technologies that utilize the same physical hardware (for example, low transmission power and medium transmission power) DIOs may be sent using only one link technology (for example, medium transmission power). After establishing a routing topology, devices dynamically switch to using a different network interface across a single link (for example, using low transmission power rather than medium power on a DAG primarily built for medium transmission power). Traffic metrics are used to determine what traffic should be mapped to which routing topologies.

Figure 6:
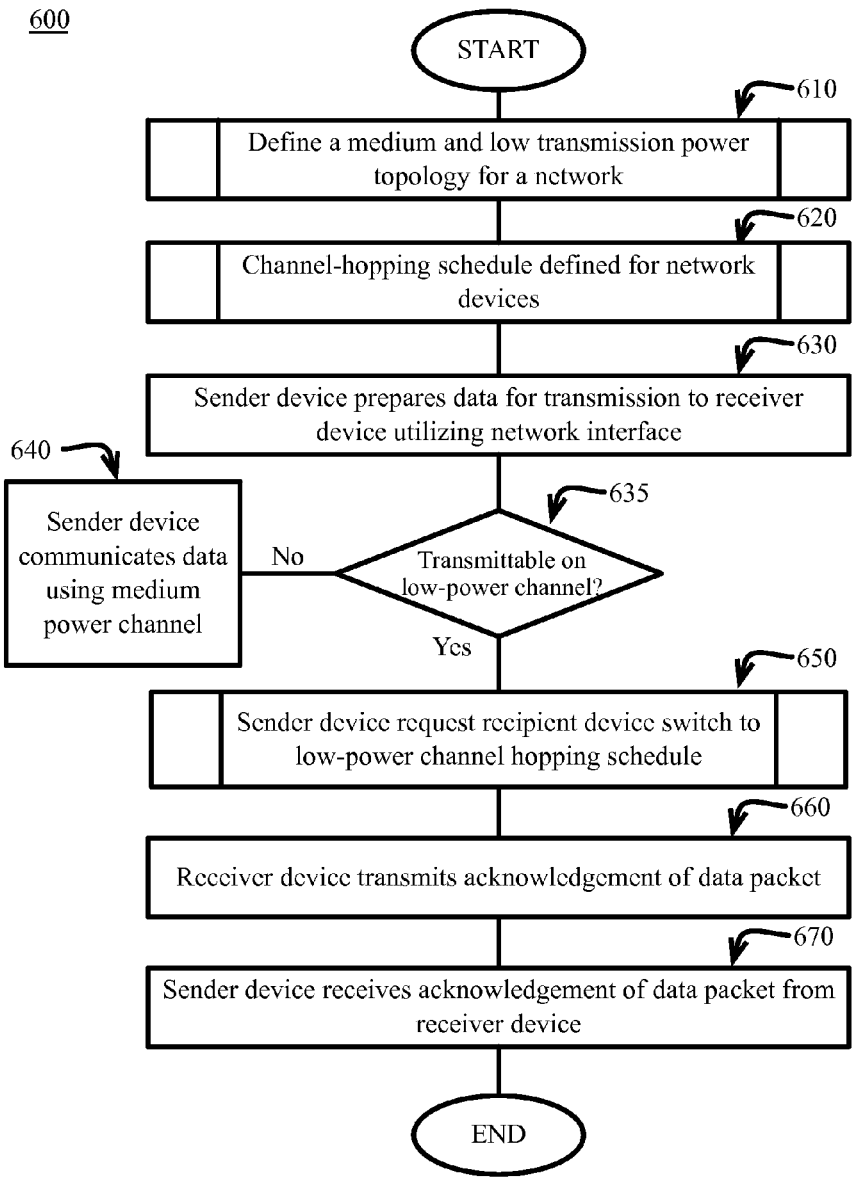
FIG. 6 is a block flow diagram depicting a method for on-demand medium to low-power channel switching during network communications in accordance with certain example embodiments.

FIG. 6 is a block flow diagram depicting a method 600 for on-demand medium-power to low-power channel switching during network communications, in accordance with certain example embodiments. The method 600 is described with reference to the components illustrated in FIGS. 1-5.

In an example embodiment, the device 200 is a sender device/node 200a that transmits one or more data packets to one or more recipient devices/nodes 200b over a network 100. In certain example embodiments, the sender devices 200a and receiver devices 200b communicate over a single network using both low-power and medium-power channels on the same radio hardware. In certain example embodiments, the network is a low power and lossy network (LLN). In certain example embodiments, the LLN is a smart utility network, wherein the network devices 200 comprise a u) combination of residential meters and distribution automation (DA) devices.

In block 610, network devices 200 define a medium-power and low-power channel routing topology for a network. The method 610 is described in more detail hereinafter with reference to methods described in FIG. 7.

Figure 7:
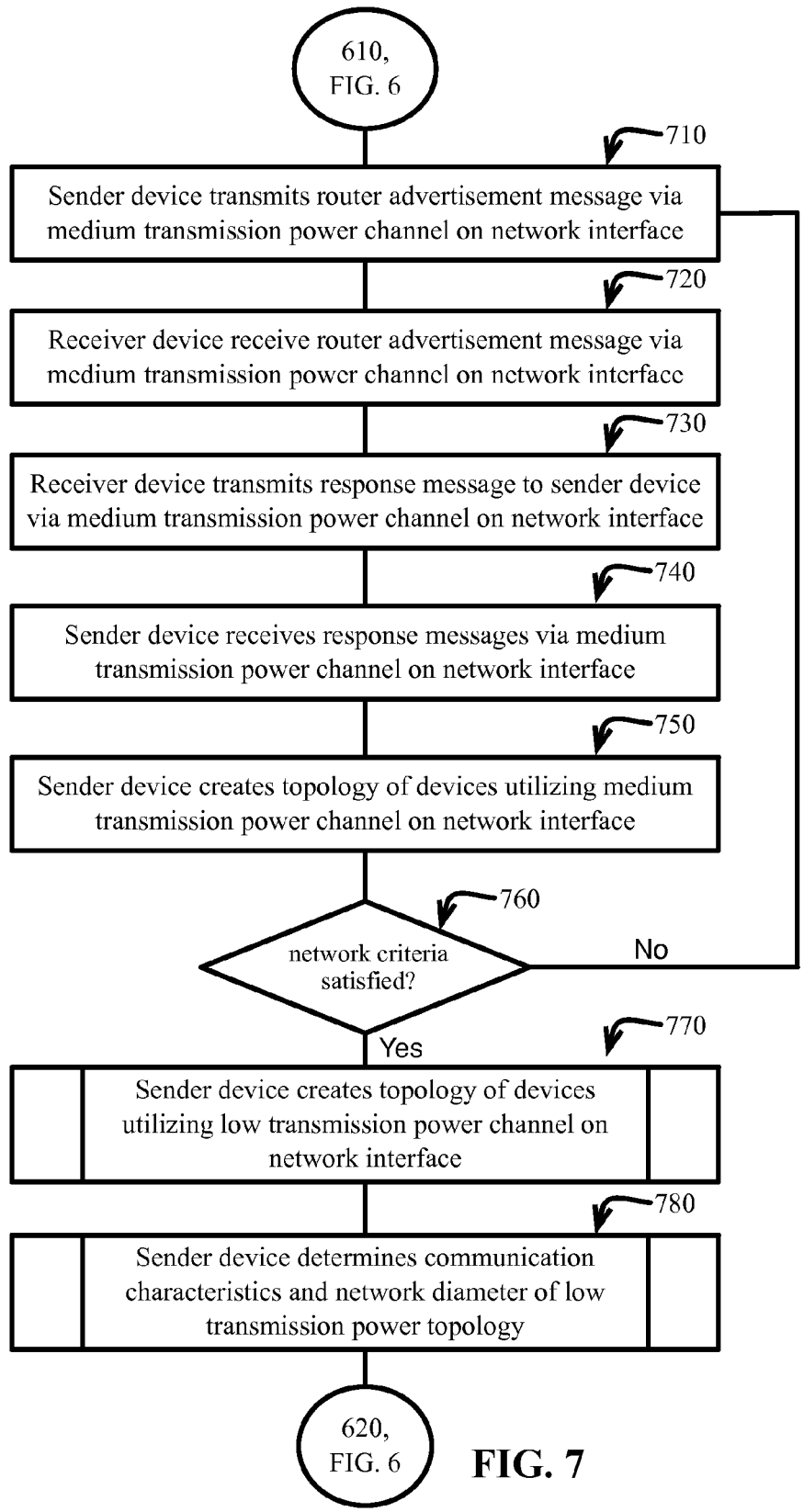
FIG. 7 is a block flow diagram depicting a method for defining medium-power and low-power channel routing topologies for a network in accordance with certain example embodiments.

FIG. 7 is a block flow diagram depicting a method 610 for defining a medium-power and low-power channel routing topology for a network, in accordance with certain example embodiments, as referenced in block 610 of FIG. 6. The method 610 is described with reference to the components illustrated in FIGS. 1-5.

In block 710, a sender device 200a transmits a router advertisement message via a medium-power channel according to a defined objective function. The objective function may have been defined on the sender device 200a, or may have been defined on and received from a root network device or network management system 130. In certain example embodiments, the network 100 may comprise multiple sender devices 200. The objective function specifies rules for building the network such as the number of nodes, parents, and back-up parents the network is to contain. A routing protocol implements the objective function by specifying a set of control messages to exchange network structure information, such as DAG information. For example, a sender device 200a may communicate a DODAG information object (DIO) message using a medium-power channel to identify neighboring receiver devices 200b that are within range of the sender device 200a.

In block 720, one or more receiver devices 200b within medium-power channel range of the sender device 200a, receive the router advertisement message via the medium-power channel. The receiver device 200b will then process the routing protocol specified in the router advertisement message to determine if the receive device 200b should join the network. For example, the receiver device 200b may execute a pre-defined algorithm using inputs from the router advertisement message to determine if the receiver device 200b meets the criteria defined by the objective function for joining the network.

In block 730, each receiver device 200b that received the router advertisement message and decides to join the network, transmits a response message to the sender device 200a to confirm receipt of the router advertisement message via the medium-power channel, or via a channel designated in the router advertisement message. The response message may include location information for the receiver device 200b. For example, the location information may indicate the receiver device 200b position in the network structure information hierarchy.

In block 740, the sender device 200a receives one or more response messages from the receiver devices 200b via the medium-power channel, or via the channel designated in the router advertisement message. In certain example embodiments, each of the response messages indicates that receiver device 200b has joined the network and formed a link with the sender device 200a.

In block 750, the sender device 200a updates the network structure information to include the receiver devices 200b that joined the network. For example, the DAG information will be updated to reflect the new receiver devices 200b that have been added to the network. In one example embodiment, a sender device 200a may operate in a non-storing mode if it only needs to know how to communicate with a root device and does not need to know what devices are below it in the network structure. Accordingly, the sender device 200a will forward the receiver device 200b response message to a root network device or network management system rather than store the update network structure information on the sender device 200a. In another example embodiment, the sender device 200a may operate in a storing mode and update network structure information stored on the sender device 200a based on the network structure information provided in the response in from the receiver device 200b. When operating in storing mode the sender device 200a may also communicate the response message to the root device in addition to updating the network structure information stored on the sender device 200a The updated network structure information defined across multiple sender devices 200a, or defined centrally at a root network device, or network management system 130, defines a medium-power channel topology for the network.

In block 760, a receiver device 200b determines from the network structure information if the requirements defined by the objective function have been met. For example, a receiver device 200b that is now linked to the sender device 200a can determine from the objective function whether additional receiver devices 200b need to be added to the network 100. If additional receiver devices 200b need to be added to the network 100, the method returns to block 710, and blocks 710 through 750 are repeated from the perspective of the receiver device 200b now acting as the sender device 200a.

In another example embodiment, two separate objective functions are defined. A first objective function defines the network structure requirements for a medium-power channel routing topology and a second objective function defines the network structure requirements for a low-power channel routing topology. The medium-power and low-power objective functions may be defined by a sender device 200a, a root device, a network management system 130, or a system operator. A first instance identifier is assigned to the network structure information defined by the routing protocol implementing the medium-power channel objective function, and a second instance identifier is assigned to the network structure information defined by the routing protocol implementing the low-power objective function. Blocks 710 and 750 proceed as outlined above, except that the sender device 200a communicates a router advertisement on the medium-power channel and a separate router advertisement on a low-power channel. Receiver devices that acknowledge the medium-power channel advertisement are mapped to the instance of medium-power network structure information and receiver devices that acknowledge the low-power channel advertisement are mapped to the instance of the low-power network structure information as outlined above.

Returning to block 760, if additional receiver devices 200b do not need to be added to the network, the method 610 proceeds to block 770.

In block 770, the network devices 200 define a low-power channel routing topology for the same network. The method 770 is described in more detail hereinafter with reference to methods described in FIG. 8. Method 770 is not required if a medium-power and low-power objective function are used in blocks 710-750 above.

Figure 8:
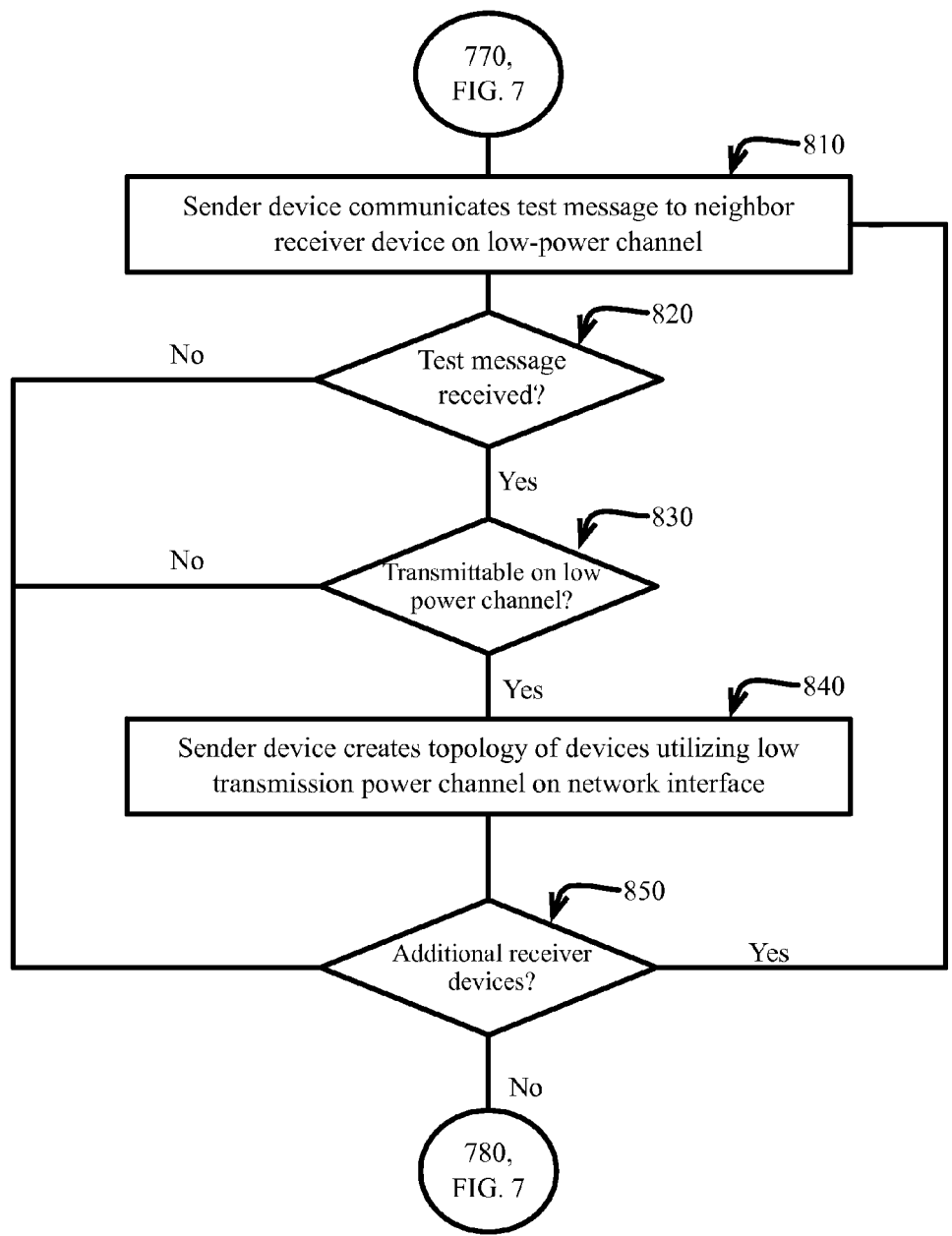
FIG. 8 is a block flow diagram depicting a method for defining a low-power channel topology for the network in accordance with certain example embodiments.

FIG. 8 is a block flow diagram depicting a method 770 for defining a low-power channel topology for the network 100, in accordance with certain example embodiments, as referenced in block 770 of FIG. 7. The method 770 is described with reference to the components illustrated in FIGS. 1-5.

In block 810, a sender device 200a in the network 100 as defined above in blocks 710-750, evaluates the link quality of each neighboring receiver device 200b. For example, the sender device 200a may communicate a test message to the receiver device 200b. For example, the test message may comprise an IPv6 NS message, or a keep alive message.

In block 820, the sender device 200a determines if the test message was received. For example, the test message sent to the receiver device 200b may include instructions for the receiver device 200b to send an acknowledgement message in response to receiving the test message. The sender device 200a may wait for an acknowledgement message for a defined period of time. If the acknowledgement message is not received, the method 770 proceeds to block 850. Block 850 will be described in further detail below. If the acknowledgement message is received, then the method proceeds to block 830.

In block 830, the sender device 200a determines if the link quality between the sender device 200a and the receiver device 200b is sufficient to support low-power channel communications. For example, the link quality may indicate that the sender device 200a and receiver device 200b are within a defined signal quality threshold for low-power channel communications. The sender device 200a may further evaluate other metrics, such as, but not limited to, data transmission rate and latency. In certain example embodiments, the test message may include instructions for the receiver device 200b to include certain data on the signal quality in the acknowledgement response to assist the sender device 200a in evaluation of the link quality between the sender device 200a and the receiver device 200b.

If the link quality between the sender device 200a and the receiver device 200b is below the low-power signal threshold, the method 770 proceeds to block 850, where the sender device 200a determines if there are additional links to other receiver devices 200b to evaluate.

Returning to block 830, if the link quality between the sender device 200a and the receiver device 200b is above the low-power signal threshold, the method 770 proceeds to block 840.

In block 840, the sender device 200a maps the topology of surrounding receiver devices 200b that the sender device 200a can communicate with via low-power channel communications. For example, the sender device 200a may update the network structure information to indicate those links that the sender device 200a can use low-power channels to communicate. As a result the medium-power topology defined in block 750 above may utilize some links with lower-power transmissions, thereby supporting medium-power and low-power communications using a single RF front-end. The use of a low-power or medium-power communication can then be determined dynamically in response to network traffic metrics or given data types as described in further detail hereinafter with reference to blocks 630 to 665 of FIG. 6.

In block 850, the sender device 200a determines if additional links to other receiver devices 200b remain to be evaluated. If the sender device 200a detects additional links to evaluate, the method 770 returns to block 810, and blocks 810-840 are repeated. If the sender device 200a does not detect additional links to evaluate, the method 770 proceeds to block 780 of FIG. 7.

The method 770 as referenced in FIG. 8 may be used to map additional u) topologies. For example, in the case of TEPCO, where network devices 200 effectively support three different physical layers (802.15.4 low-power, 802.15.4 medium-power, and P19021.2), the method 770 may be repeated to map the additional topology. In certain example embodiments, it is possible to dynamically switch to using a different physical layer as long as the routing topology remains intact.

Returning to FIG. 7, at block 780, a network control device, such as a network management system 130, determines communication characteristics and network diameter of the medium-power and low-power routing topologies. The method 780 is described in more detail hereinafter with reference to methods described in FIG. 9.

Figure 9:
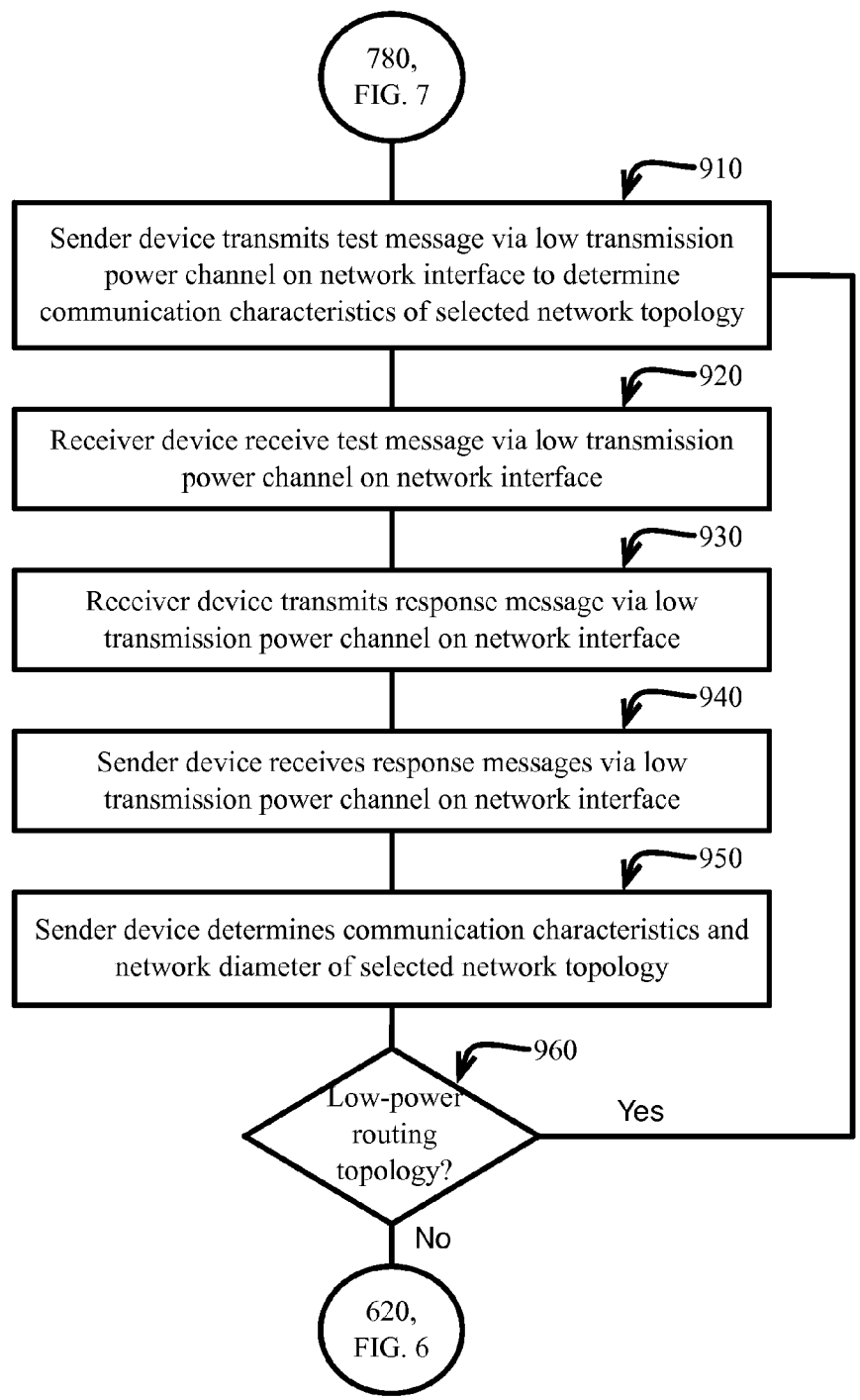
FIG. 9 is a block flow diagram depicting a method for dynamically mapping traffic to different routing technologies in accordance with certain example embodiments.

FIG. 9 is a block flow diagram depicting a method 780 for dynamically mapping traffic to different routing technologies, in accordance with certain example embodiments, as referenced in block 780 of FIG. 7. The method 780 is described with reference to the components illustrated in FIGS. 1-5.

In block 910, a network device 200, communicates a test message across a medium-power channel routing topology of the network. In certain example embodiments, the network device 200 is the network management system device 130. For example, the network device 200 may communicate the test message to a terminal receiver device 200b. The test message may comprise instructions for the terminal receiver device 200b to communicate a response message after receiving the test message.

In block 920, the terminal receiver device 200b receives the test message from the network device 200 via a medium-power channel routing topology and prepares a response message.

In block 930, the terminal receiver device 200b communicates a response message to the network control device 130 via the same medium-power channel topology that the test message was received from. The response message may include additional information, such as the time of receipt of the control message.

In block 940, the network device 200 receives the response message from the receiver device 200b.

In block 950, the network device 200 determines the communication characteristics and network diameter of the medium-power channel routing topology. For example, the network management device 130 may use information included in the response message, such as the time of receipt of the test message, to determine network latency and diameter. In certain example embodiments, network diameter refers to the number of hops required for a data packet or message to move from an originating network device 200, such as a root network device, to a terminal receiver device 200b In block 960, the network device 200 determines if the network also comprises a low-power or other power channel routing topology. If the network does comprise a low-power or other power channel routing topology, then the method 780 returns to block 910, and blocks 910 to 950 are repeated, except the test message is communicated to a terminal receiver device 200b via the low-power or other power channel routing topology.

If the network does not comprise a low-power or other power channel routing topology, then the method 780 proceeds from block 960 to block 620 of FIG. 6.

Returning to FIG. 6, in block 620, a network management device 130 defines channel-hopping schedules for communicating via the network 100. The method 620 for defining channel-hopping schedules is described in more detail hereinafter with reference to the methods described in FIG. 10.

Figure 10:
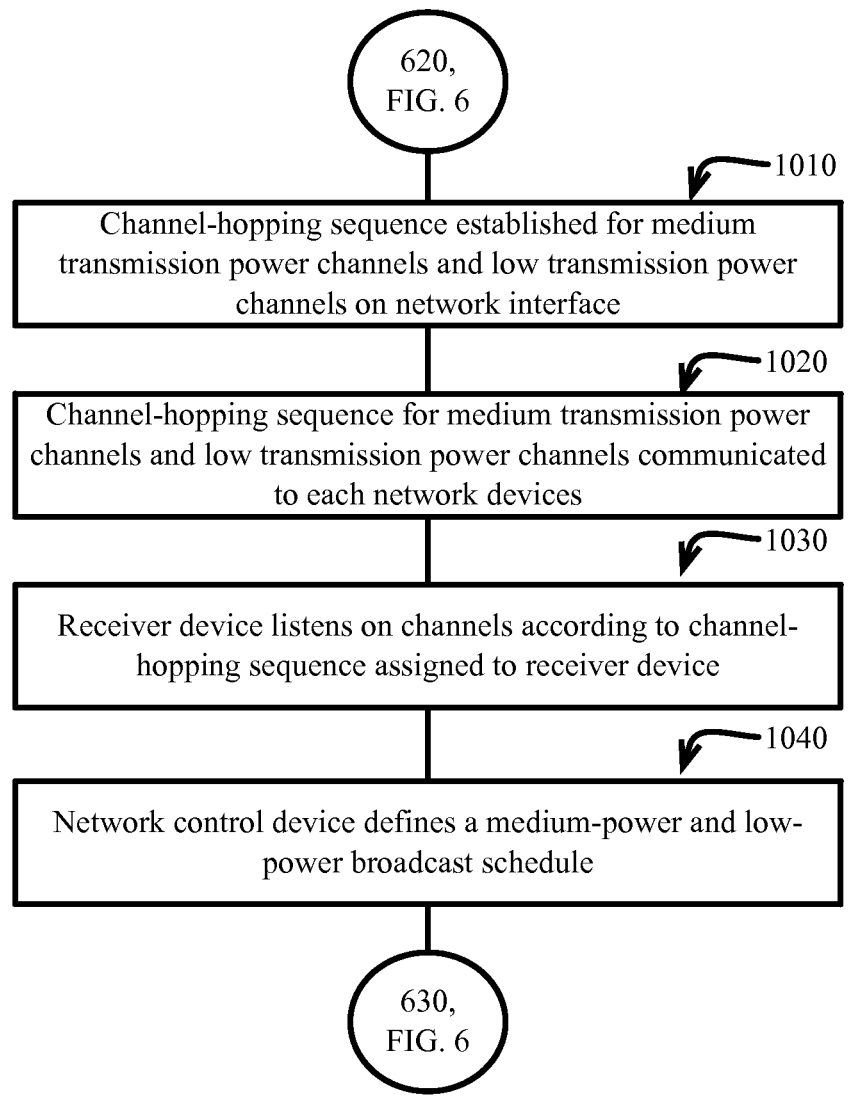
FIG. 10 is a block flow diagram depicting a method for defining a channel-hopping schedule for network devices in the network in accordance with certain example embodiments.

FIG. 10 is a block flow diagram depicting a method 620 for defining a channel-hopping schedule for network devices 200, in accordance with certain example embodiments, as referenced in block 620 of FIG. 6. The method 620 is described with reference to the components illustrated in FIGS. 1-5.

In block 1010, a network management device 130 defines a medium-power and low-power channel-hopping schedule. In one example embodiment, the medium power channel-hopping schedule may include only medium power channels. Likewise, the low-power channel-hopping schedule may include only low-power channels. In another example embodiment, may be a mixed channel-hopping schedule comprising a mixture of interleaved medium-power and low-power channels. For example, a single channel-hopping sequence may comprise alternating medium-power channels and low-power channels. The allocation and periodicity may be arbitrary. For example, a mixed channel-hopping schedule may comprise three consecutive medium-channel slots and only one low-power channel slot in the schedule sequence. Furthermore, it is possible to change the pattern at a later time, for example, in response to changing network traffic metrics or data types. For example, the channel-hopping sequence may be changed to include more low-power channels to allow for increased traffic between two network devices when low-power channel transmissions are warranted. The use of a mixed channel-hopping sequences with alternating medium-power and low-power channels allows a single network device 200 to communicate to neighboring network devices 200 on either the low-power or medium-power channels. For example, neighboring network devices 200 may communicate using low-power channels any time a low-power channel is active in the channel-hopping sequence on both devices, and communicate using a medium-power channel any time a medium-power channel is active in the channel-hopping sequence on both devices. In embodiments with additional routing topologies, additional channel hopping schedules may be defined for those topologies, including mixed channel hopping schedules with slots to accommodate the additional topology.

In block 1020, a root network device 200 communicates the channel-hopping sequences to all other network devices 200 in the network. The root network device 200 may define a default channel-hopping schedule. In one example embodiment, all network devices 200 may use a default medium-power channel-hopping schedule. In certain example embodiments, multiple channel-hopping schedules are provided to each network device 200. For example, the network devices 200 may receive a medium-power channel-hopping schedule, a low-power channel-hopping schedule, and one or more mixed channel-hopping schedules. In certain example embodiments, the network devices 200 may be provided with multiple mixed channel-hopping schedules with each mixed channel-hopping schedule comprising a different proportion and sequence of medium-power channel and low-power channel slots. In certain other example embodiments, network devices 200 may receive a channel-hopping schedule based on the type of device it is, the primary data traffic that the device 200 will receive and transmit, or a combination thereof. For example, a device 200 that will primarily transmit data packets of small size and low priority may be provided with a low-power channel-hopping sequence or a mixed channel-hopping sequence with a higher proportion of low-power channel slots.

In block 1030, each network device 200 listens on the default channel-hopping schedule assigned to it. In certain example embodiments, the default channel-hopping schedule is a medium-power channel-hopping schedule. In certain other example embodiments, the default channel-hopping schedule is a mixed channel-hopping schedule. In one example embodiment, each device operates on a channel-hopping schedule for that specific device. This action allows two neighboring network devices 200 to communicate with other network devices 200 in the network simultaneously with minimal interference because each device, at any given point in time, is more likely to be using a different channel.

In block 1040, a network management device 130 defines a medium-power broadcast schedule and a low-power broadcast schedule. The broadcast schedule defines a set time interval at which all devices 200 on the network 100 will synchronize on the same channel. This action will allow a network device 200 to send a message to any neighboring devices 200 within range. For example, if a sender device 200a has data it would like to send using a low-power channel, but the neighboring devices 200 are operating on a medium-power channel hopping schedule, the sender device 200a can send a message during the appropriate broadcast interval requesting the receiver device 200b synchronize to a designated low-power channel-hopping sequence so that the sender device 200a can communicate the data to the receiver device 200b. In one example embodiment, the low-power channel-hopping sequence may be an all low-power channel-hopping sequence. In another example embodiment, the low-power channel-hopping sequence may be a mixed channel-hopping sequence with a sufficient number of low-power channel slots to communicate a given data packet. For example, a larger data packet may require more low-power channel slots than a smaller data packet.

From block 1040, the method 620 returns to block 630 in FIG. 6.

Returning to FIG. 6, in block 630, a sender device 200a prepares data for transmission to a recipient device 200b. In an example embodiment, the data comprises a data packet or data formatted for transmission over the network interface 210. In an alternative example embodiment, the data comprises a series of bytes or characters. In an example embodiment, the sender device 200a prepares the data for transmission to the recipient device 200b by formatting the data into packets. In an alternative example embodiment, the data is prepared by one or more other network devices 200 and transmitted to the sender device 200a.

In block 635, the sender device 200a determines if the data is transmittable via a low power communication channel. For example, the sender device 200a will determine the size of a given data packet and the priority or latency sensitivity of the data packet. For a given data packet size and priority status, the system may define a data rate threshold and select a medium power or lower power channel based on the needed data rate. For example, medium-power channels may be tuned to a lower data rate to increase communication range and robustness compared to the higher data rates of a lower-power channel. However, the size of a given data packet may make the higher data rate of a lower-power channel more preferable. In one example embodiment, data packets may be mapped to low-power or medium-power links. For example, if the network uses IPv6, DSCP markings may map the data packet for low-power channel or medium-power channel transmission. In one example embodiment, the mapping may be provided statically through configuration. For example, the data type may be mapped using DHCPv6 or network management system 130 registration. In another example embodiment, a network device 200, or the network management device 130, may observe the data type it is forwarding and dynamically map the data as described below.

In certain example embodiments, the sender device 200a will determine if a trigger event has occurred before determining to communicate the information over a low-power channel. For example, certain data types may be latency sensitive and require immediate communication across a robust signal. Accordingly, in such situations there may not be time to coordinate sending the data via a low-power channel topology. In certain example embodiments, the sender device 200a determines whether a packet can be sent over a low-power channel based on detection of a trigger event. For example, distribution automation (DA) devices on a smart utility network may dynamically switch to a medium-power channel sequence upon detection of a power outage to increase the robustness of traffic for the DA devices. Accordingly, if a trigger event is detected, then the sender device 200a will not communicate the data over a low-power channel.

If the data cannot be transmitted via a low-power channel, then the method 600 proceeds to block 640. In block 640, the sender device 200a communicates the data via a medium-power channel according to the sender device 200a channel-hopping schedule. If the sender device 200a is operating on a low-power channel only schedule, the sender device 200a may switch to the receiver device 200b medium-power channel-hopping schedule to complete the data transmission to the receiver device 200b. In certain example embodiments, the sender device 200a selects which medium-power channels to use in the medium-power channel-hopping sequence based on the type of data the sender device 200a is transmitting. For example, the sender device 200a may select the medium-power channel or channels to use based on the priority level of the data packet. Lower frequency medium-power channels have a larger carrier-sense duration, for example, greater than 5 ms, than higher frequency medium-power channels with a carrier-sense duration greater than 128 μs. As a result, higher frequency channels may be used to communicate higher priority traffic. Some LLNs, depending on national jurisdiction, share bandwidth with other network types. For example, the low frequency channels of an LLN operating according to the Association of Radio Industries and Businesses (ARIB) regulations, share bandwidth with passive tag systems in the 920 MHz range. In certain example embodiments, the sender device 200a may select a medium-power channel-hopping sequence that alternates between using low frequency and high frequency channels to minimize the amount of interference from overlapping bandwiths.

Returning to block 635, if the data can be transmitted via a low-power communication channel, then the method 600 proceeds to block 650.

In block 650 the sender device 200a request a receiver device 200b switch to a low-power channel. The method for communicating a control message to a receiver device 200b is described in more detail hereinafter with reference to the methods described in FIG. 11.

Figure 11:
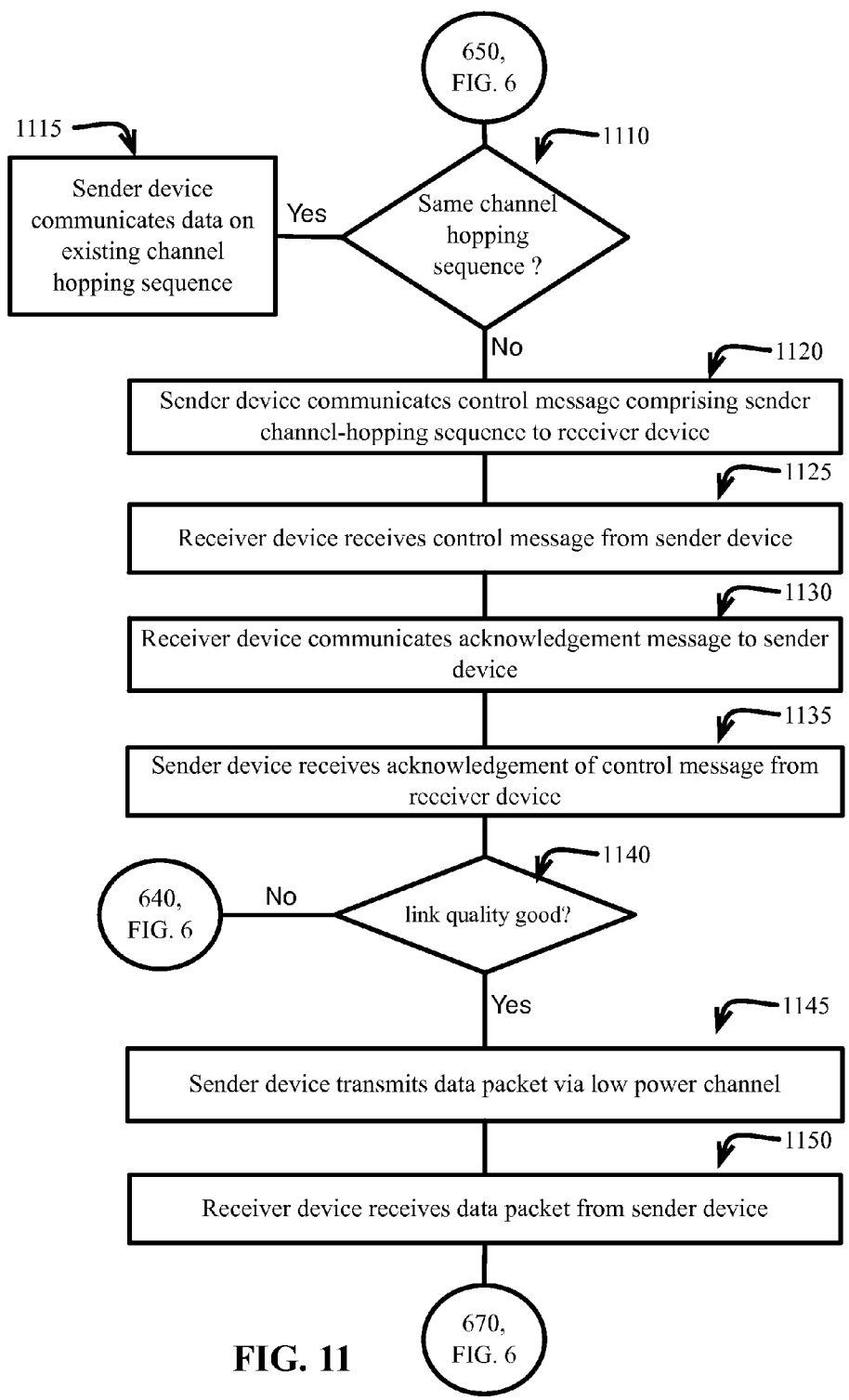
FIG. 11 is a block flow diagram depicting a method for a sending device to request a recipient to switch to a low-power hopping schedule in accordance with certain example embodiments.

FIG. 11 is a block flow diagram depicting a method 650 for a sending device 200a to send a request to a receiver device 200b to switch to a low-power channel, in accordance with certain example embodiments, as referenced in block 650 of FIG. 6. The method 650 is described with reference to the components illustrated in FIGS. 1-5.

In block 1110, the sender device 200a determines if the receiver device 200b is on the same channel, or channel hopping schedule. For example, the sender device 200a may know based on its own channel-hopping sequence if a default channel-hopping sequence was assigned to all devices in the network as described previously with reference to block 1020 of FIG. 10. Alternatively, the sender device 200a may transmit a test message to the receiver device 200b. For example, the sender device may transmit the test message using a low-power channel and wait for a response from the recipient device 200b. If the recipient device 200b does not acknowledge the test message within a defined amount of time, the sender device 200a will know that the receiver device is not operating on a low-power channel hopping schedule.

If the sender device 200a determines that the sender device 200a and recipient device 200b are on the same low-power channel hopping schedule, the method proceeds to block 1115.

In block 1115, the sender device 200a communicates the data packet to the receiver device 200b using the shared low-power channel hopping schedule. The shared-low power channel hopping schedule may comprise only low-power channels in the sequence or may be a mixed channel-hopping sequence with sufficient low-power iii channel frames to communicate the given data packet.

Returning to block 1110, if the response message from the receiver device 200b indicates that the receiver device 200b is not on the desired low-power channel hopping schedule, then method proceeds to block 1120.

In block 1120, the sender device 200a transmits a control message to the receiver device 200b. The control message is a short message that indicates that the sender device 200a intends to communicate a data packet on a different channel or channel-hopping sequence, such as a low-power channel hopping sequence, to the receiver device 200b. In certain example embodiments, the control message is communicated according to a network broadcast schedule as discussed with reference to block 1040 of FIG. 10. In one example embodiment, the control message may specify the low-power channel on which the receiver device 200b needs to listen. The control message may further comprise an indication of how long to listen on the designated low-power channel. The length of time indicated in the control message may be just long enough for the receiver device 200b to detect a start-of-frame delimiter for the data packet, or may be long enough for the receiver device 200b to receive multiple data frames back-to-back. In certain example embodiments, the control message may indicate a low-power channel-hopping schedule to use for a limited period of time.

The low power channel-hopping sequence may be communicated to the receiver device 200b in an Information Element. The channel-hopping information may be formatted in a number of ways. In certain example embodiments, the channel-hopping information may include the sender device 200a current time and slot index. In one example embodiment, the receiver device 200b uses the time and slot index as inputs in a defined channel-sequence function that outputs a channel number. For example, a channel-sequence function may exist that generates fewer medium power channels more appropriate for one data type, and another channel-sequence function may exist that generates more medium-power channels appropriate for another data type. The sender device 200a may provide the appropriate channel-sequence function for generating a low-power channel sequence to the receiver device 200b when communicating the current time and slot index. In other example embodiments, the appropriate channel-hopping functions may already be pre-installed on receiver device 200b.

The control message may further include other transmission parameters such as, but not limited to, data rate and modulation. The control message may be transmitted over a medium-power channel as dictated by the network default channel-hopping schedule. In another example embodiments, the control message may be transmitted via a the channel-hopping schedule of the receiver device 200b. In yet another example embodiment, the control message may be transmitted via a low-power channel In block 1125, the receiver device 200b receives the control message from the sender device 200a. In one example embodiment, the receiver device 200b may evaluate the signal quality of the control message. For example, the receiver device 200b may evaluate metrics such as, but not limited to, the received signal strength indication (RSSI) and the link quality indication (LQI), of the control message transmission.

In block 1130, the receiver device 200b transmits an acknowledgement message to the sender device 200a. The acknowledgement message may indicate the receiver device 200b has switched to the indicated low-power channel or low-power channeling hopping sequence. In one example embodiment, the acknowledgement message may be sent back to the sender device 200a on the same channel that the control message was sent by the sender device 200a to the receiver device 200b. In another example embodiment, the acknowledgement message may be sent back using the channel-hopping sequence of the sender device 200a. In yet another example embodiment, the acknowledgement message may be sent back on the low-power channel specified in the control message. In one example embodiment, the acknowledgement message may include link quality information, for example, the RSSI/LQI discussed in block 1120 above.

In block 1135, the sender device 200a receives the acknowledgement message from the receiver device 200b.

In block 1140, the sender device 200*a* determines if the link quality with the receiver device 200*b* is sufficient to communicate the date packet via a low-power channel. For example, the acknowledgement message from the receiver device 200*b* may indicate that the link quality is too poor to communicate via a low-power channel. In certain example embodiments, the acknowledgement request may indicate the control message request to communicate over a low-power channel has been denied by the receiver device 200*b* and may further include an alternate medium-power channel or medium-power channel hopping schedule. In certain example embodiments, the sender device 200*a* may evaluate the link quality information included in the acknowledgement message and determine if the link quality parameters exceed a configurable threshold established to meet specified transmission parameters. The threshold may be adjusted based on the type of data to be communicated. For example, the threshold may be adjusted if the data packet is indicated as a priority packet. In another embodiment, the threshold may be dynamically adjusted based on the observed traffic metrics. For example, if the sender device 200*a* determines from observed traffic metrics sensed either at the sender device 200*a*, or provided by a central routing device such as the NMS 130, that the traffic levels are high on the medium channels, the link quality threshold for determining whether to use a low-power channel may be decreased. If the link quality is below the designated threshold, the method 650 proceeds to block 640 of FIG. 6 and an appropriate medium power channel is used to transmit the data.

Returning to block 1140, if the link quality is above the designated threshold the method 650 proceeds to block 1145 where the sender device 200*a* communicates the data packet to the receiver device 200*b* via the designated low power channel or low-power channel hopping sequence.

In block 1150, the receiver device receives the data packet from the sender device 200*a* The method 650 the proceeds to block 660 in FIG. 6.

Returning to FIG. 6, at block 660, the receiver device 200*b* transmits an acknowledgement message to the sender device 200*a* using the channel-hopping sequence or via another channel as described herein, where the acknowledgement message indicates receipt of the transmitted data packet.

In block 670, the sender device 200*a* receives the acknowledgement packet from the receiver device 200*b*.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, an ordinarily skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be repeated, performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A method, comprising:
   in a low power and lossy network (LLN) comprising a plurality of computing devices, generating, by a device, a mixed channel-hopping sequence comprising an interleaved low-power channel hopping sequence and a medium-power channel hopping sequence, such that neighboring devices in the network may use both low-power and medium-power channels to communicate with the device;
   communicating, by the device, the mixed channel-hopping sequence to a neighboring device; and
   communicating, between the device and the neighboring device, according to the mixed channel-hopping sequence.

2. The method of claim 1, wherein the mixed channel-hopping sequence is communicated by transmitting a control message to the neighboring device, the control message comprising a current time and slot index of the device.

3. The method of claim 2, wherein the neighboring device uses the time and slot index as inputs to a channel-sequence function to generate the mixed channel-hopping sequence.

4. The method of claim 3, wherein the channel-sequence function is provided by the device in the control message.

5. The method of claim 3, wherein the channel-sequence function generates a channel-hopping sequence with a higher proportion of medium-power channel slots to low-power channel slots.

6. The method of claim 5, wherein the device communicates the mixed channel-hopping sequence comprising a higher proportion of medium power channel slots to low-power channel slots to the neighboring device in response to an event.

7. The method of claim 6, wherein the event comprises a power outage.

8. The method of claim 3, wherein the channel-sequence function generates a channel-hopping sequence with a higher proportion of low-power channel slots to medium power channel slots.

9. An apparatus, comprising:
one or more network interfaces to communicate with a low power and lossy network (LLN);
a processor coupled to the network interfaces and adapted to execute one or more processes; and
a memory configured to store a process executable by the processor, the process when executed operable to:
generate a mixed channel-hopping sequence comprising an interleaved low-power channel hopping sequence and a medium-power channel hopping sequence such that neighboring devices in the network may use both low-power and medium-power channels to communicate with the device;
communicate the mixed channel-hopping sequence to one or more neighboring devices; and
communicate between the device and the one or more neighboring devices, according to the mixed channel-hopping sequence.

10. The apparatus as in claim 9, wherein the mixed channel-hopping sequence is communicated to each of the one or more neighboring devices by transmitting a control message to each neighboring device, the control message comprising a current time and slot index of the apparatus.

11. The apparatus as in claim 10, wherein each neighboring device uses the time and slot index as inputs to a channel-sequence function to generate the mixed channel-hopping sequence.

12. The apparatus as in claim 11, wherein the channel-sequence function is provided by the device in the control message.

13. The apparatus as in claim 11, wherein the channel-sequence function generates a channel-hopping sequence with a higher proportion of medium-power channel slots to low-power channel slots.

14. The apparatus as in claim 13, wherein the device communicates the mixed channel-hopping sequence comprising a higher proportion of medium-power channel slots to low-power channel slots to each neighboring device in response to an event.

15. The apparatus as in claim 14, wherein the event comprises a power outage.

16. A tangible, non-transitory, computer-readable media having software encoded thereon, the software when executed by a processor operable to:
in a low power and lossy network (LLN) comprising a plurality of nodes, generate a mixed channel-hopping sequence comprising an interleaved low-power channel hopping sequence and a medium-power channel hopping sequence, such that a single device in the network may allow neighboring devices in the network to use both low-power and medium-power channels to communicate with the single device;
communicate the mixed channel-hopping sequence to a plurality of devices in the network; and
communicate between the single device at least one of the neighboring devices according to the mixed channel-hopping sequence.

17. The computer-readable medium as in claim 16, wherein the software when executed is further operable to communicate a control message to the at least one of the neighboring devices, the control message comprising a current time and slot index, wherein each of the at least one of the neighboring devices uses the current time and slot index as inputs to a channel-sequence function to generate the mixed channel hopping sequence on each of the at least one of the neighboring devices.

18. The computer-readable medium as in claim 17, wherein the control message is transmitted to at least one of the neighboring devices in response to detection of an event.

19. The apparatus as in claim 11, wherein the channel-sequence function generates a channel-hopping sequence with a higher proportion of low-power channel slots to medium power channel slots.

20. The computer-readable medium as in claim 18, wherein the event comprises a power outage.

21. The apparatus as in claim 11, wherein the channel-sequence function generates a channel-hopping sequence with a higher proportion of medium-power channel slots to low-power channel slots.

22. The computer-readable medium as in claim 17, wherein the channel-sequence function generates a channel-hopping sequence with a higher proportion of medium-power channel slots to low-power channel slots.

23. The computer-readable medium as in claim 17, wherein the channel-sequence function generates a channel-hopping sequence with a higher proportion of low-power channel slots to medium power channel slots.

* * * * *